(12) United States Patent
Aksit

(10) Patent No.: US 9,835,253 B2
(45) Date of Patent: Dec. 5, 2017

(54) BRUSH SEAL ASSEMBLY

(71) Applicant: DOOSAN HEAVY INDUSTRIES CONSTRUCTION CO., LTD., Gyeongsangnam-do (KR)

(72) Inventor: Mahmut Faruk Aksit, Istanbul (TK)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 393 days.

(21) Appl. No.: 14/733,709

(22) Filed: Jun. 8, 2015

(65) Prior Publication Data

US 2016/0047475 A1    Feb. 18, 2016

(30) Foreign Application Priority Data

Jun. 9, 2014 (KR) .................. 10-2014-0069606
Jun. 9, 2014 (KR) .................. 10-2014-0069607

(51) Int. Cl.
*F16J 15/44* (2006.01)
*F16J 15/3288* (2016.01)
*F01D 11/00* (2006.01)
*F16J 15/3268* (2016.01)

(52) U.S. Cl.
CPC .......... *F16J 15/3288* (2013.01); *F01D 11/00* (2013.01); *F16J 15/3268* (2013.01); *F16J 15/442* (2013.01); *F05D 2220/32* (2013.01); *F05D 2240/56* (2013.01)

(58) Field of Classification Search
CPC ....... F16J 15/3288; F16J 15/441; F16J 15/442
See application file for complete search history.

(56) References Cited

U.S. PATENT DOCUMENTS

| | | | | |
|---|---|---|---|---|
| 5,201,530 A | * | 4/1993 | Kelch | .............. F16J 15/3288 277/355 |
| 6,045,134 A | * | 4/2000 | Turnquist | .......... F16J 15/3288 277/347 |
| 6,250,641 B1 | | 6/2001 | Dinc et al. | |
| 6,431,827 B1 | * | 8/2002 | Wolfe | .............. F01D 11/127 29/888.3 |

(Continued)

FOREIGN PATENT DOCUMENTS

EP    1 672 256 A1    6/2006

OTHER PUBLICATIONS

Office Action issued in corresponding Chinese Application No. 201510309519.2, dated Dec. 22, 2016, 8 pages.

*Primary Examiner* — Vishal A Patel
(74) *Attorney, Agent, or Firm* — Baker & McKenzie LLP

(57) ABSTRACT

A brush seal assembly may include: a packing body configured to be positioned between a rotating body and a fixing body and provided with an insertion groove; a brush seal part configured to include a brush extending toward the rotating body in a state in which one end of the brush seal part is inserted into the insertion groove and a support member supporting the brush; a thermal expansion member configured to adhere to a side of the support member and be thermally expanded in a circumferential direction of the packing body; and a fixing member configured to be fitted in the insertion groove to face the thermal expansion member to simultaneously fix the brush seal part in the circumferential direction and a radial direction of the packing body.

20 Claims, 25 Drawing Sheets

(56) References Cited

U.S. PATENT DOCUMENTS

| | | | | |
|---|---|---|---|---|
| 6,435,514 B1* | 8/2002 | Aksit | .................. | F16J 15/3288 |
| | | | | 277/355 |
| 6,540,231 B1* | 4/2003 | Trantow | ................. | F01D 11/02 |
| | | | | 277/355 |
| 6,790,001 B2 | 9/2004 | Turnquist et al. | | |
| 6,860,484 B2* | 3/2005 | Urlichs | ............... | F16J 15/3292 |
| | | | | 277/355 |
| 7,032,903 B1* | 4/2006 | Dalton | ................. | F01D 11/001 |
| | | | | 277/355 |
| 7,226,054 B2* | 6/2007 | Addis | ................. | F16J 15/3288 |
| | | | | 277/355 |
| 7,445,212 B2* | 11/2008 | Gail | .................... | F16J 15/3288 |
| | | | | 277/355 |
| 8,864,138 B2* | 10/2014 | Dos Santos | ......... | F16J 15/3288 |
| | | | | 277/355 |
| 2008/0258403 A1* | 10/2008 | Beichl | ................. | F01D 11/001 |
| | | | | 277/355 |

* cited by examiner

BRUSH SEAL ASSEMBLY

CROSS-REFERENCE TO RELATED APPLICATIONS

This application claims priority to Korean Patent Application Nos. 10-2014-0069606 and 10-2014-0069607, filed on Jun. 9, 2014, the disclosures of which are incorporated herein by reference in their entirety.

BACKGROUND

Exemplary embodiments relate to a brush seal, and more particularly, to a brush seal assemble used to seal a gap between a fixing body and a rotating body of a turbine.

Generally, a turbine is a power generation apparatus which converts heat energy of a fluid like gas, steam, or the like into a torque which is mechanical energy and includes a rotor which has a plurality of buckets to shaft-rotate by the fluid and a casing which is installed to enclose a circumference of the rotor and is provided with a plurality of diaphragms.

Herein, a gas turbine is configured to include a compressor, a combustor, and a turbine, in which external air is sucked and compressed by a rotation of the compressor and is then delivered the air to the combustor, the combustor performs combustion by mixing the compressed air and fuel, and high-temperature and high-pressure gas generated from the combustor rotates the rotor of the turbine while passing through the turbine to drive a power generator.

The gas turbine and a steam turbine has a structure in which the fixing body (diaphragm) and the rotating body (rotor) relatively rotate to each other and therefore a high-temperature and high-pressure fluid is leaked through the gap between the fixing body and the rotating body. Here, the fluid leakage is one cause of reduction in energy efficiency due to a power loss. Accordingly, efforts to reduce the fluid leakage which occurs through the gap between the fixing body and the rotating body have been continuously made.

To reduce the fluid leakage, there is a need to preferentially reduce the gap between the fixing body and the rotating body but there are restrictions in making the gap narrow.

For example, in the case in which the gap is excessively narrow, an interference occurs between the rotating body and the fixing body when the rotating body shaft-rotates and thus vibrations occurs due to rubbing, which leads to a serious damage to the turbine.

BRIEF SUMMARY

An object relates to promote stable sealing and maintain a quantity of fluid moving through a brush seal by maintaining a state in which an inner circumferential surface of an insertion groove and an outer circumferential surface of a fixed member adhere to each other face-to-face so as to constantly maintain a gap between the brush seal and a rotating body even when an external force is applied to a brush seal part.

Another object is to enhance efficiency of a turbine in which a brush seal assembly is installed and enhance a fixing force of a brush seal part by moving a predetermined quantity of fluid through a brush seal and maintaining a state in which the brush seal part is coupled with an insertion groove through a fixed member in a face-to-face manner.

Still another object is to maintain a quantity of high-pressure fluid moving through a brush seal.

Still yet another object is to enhance efficiency of a turbine in which a brush assembly is installed, move a predetermined quantity of fluid through a brush seal, and stably fix the brush seal assembly in different directions.

Other objects and advantages can be understood by the following description, and become apparent with reference to the embodiments.

In accordance with one aspect, a brush seal assembly includes: a packing body configured to be positioned between a rotating body and a fixing body and provided with an insertion groove; a brush seal part configured to include a brush extending toward the rotating body in a state in which one end of the brush seal part is inserted into the insertion groove and a support member supporting the brush; a thermal expansion member configured to adhere to a side of the support member and be thermally expanded in a circumferential direction of the packing body; and a fixing member configured to be fitted in the insertion groove to face the thermal expansion member to simultaneously fix the brush seal part in the circumferential direction and a radial direction of the packing body.

The fixing member may have a polygonal shape to maintain a state in which an inner circumferential surface of the insertion groove and an outer circumferential surface of the fixing member adhere to each other at various contact surfaces.

The fixing member may include: a first fixing body configured to extend in a length direction; and a second fixing body configured to be integrally formed with the first fixing body and extend to be orthogonal to the first fixing body.

The thermal expansion member may have front and rear end portions provided with inclined surfaces inclined downward toward the fixing member.

The thermal expansion member may have front and rear end portions provided with inclined surfaces inclined upward toward the fixing member.

The fixing member may include: a guide part disposed to face the thermal expansion member and inclined toward an opposite direction to the inclined surface.

The guide part may be thermally expanded toward the inclined surface.

The guide part may include a guide protrusion protruding toward an outer side of a front surface and minimally contacting the inclined surface.

The insertion groove may include: a seal insertion groove formed in a circumferential direction inside the packing body and having the brush seal part inserted thereinto; a stepped part stepped in one side direction of the seal insertion groove; and a fixing member insertion groove formed to insert the fixing member into an inner side of the stepped part.

The insertion groove may include: a seal insertion groove formed in a circumferential direction inside the packing body and having the brush seal part inserted thereinto; and a fixing member insertion groove formed to be symmetrical with the seal insertion groove and having the fixing member inserted thereinto.

The support member may include: a first support plate adhering to one side of the brush and provided with a guide groove to guide a flow of fluid from an inner side facing the brush toward a lower portion of the brush; and a second support plate adhering to a brush in a state in which it faces the first support plate and having one side which faces a thermal expansion member and is provided with a slot groove.

The brush seal assembly may be pressed in the radial direction in both directions of front and rear ends of the brush seal part, respectively, by the fixing member and may be pressed either inward or outward based on the packing body.

In accordance with another aspect, a brush seal assembly, including: a packing body configured to be positioned between a rotating body and a fixing body and provided with an insertion groove toward the rotating body; a brush seal part configured to include a brush extending to be inclined toward the rotating body in a state in which one end of the brush seal part is inserted into the insertion groove and a support member supporting the brush; thermal expansion members configured to adhere to both sides of the support member and be thermally expanded in a circumferential direction of the packing body; and fixing members configured to be fitted in insertion grooves to fix brush seal parts and provided with a guide part to fix the brush seal parts which are thermally expanded toward each thermal expansion member to adhere to the thermal expansion members, in a circumferential direction of the packing body.

The fixing member may have a polygonal shape to maintain a state in which an inner circumferential surface and an outer circumferential surface of the insertion grooves adhere to each other in a plurality of contact surfaces and a rear surface of the fixing member may be provided with a tool insertion groove into which a tool is inserted.

The fixing member may include: an inclined part at which a front surface of the guide part is inclined toward the thermal expansion member.

The thermal expansion member may include an inclined surface inclined downward or upward toward the fixing member and is disposed to face the thermal expansion member.

In accordance with still another aspect, a brush seal assembly includes: a packing body configured to be positioned between a rotating body and a fixing body and provided with an insertion groove; a brush seal part configured to include a brush extending toward the rotating body in a state in which one end of the brush seal part is inserted into the insertion groove and a support member supporting the brush; a thermal expansion member configured to adhere to a side of the support member and be thermally expanded in a circumferential direction of the packing body; and a fixing member configured to include a head extending toward the thermal expansion member to be thermally expanded toward the thermal expansion member when being transferred with heat from the outside so as to fix the brush seal part and a body extending to a rear of the head.

The insertion groove may include: a seal insertion groove formed in a circumferential direction inside the packing body and having the brush seal part inserted thereinto; and a fixing member insertion groove configured to be opened while being adjacent to the seal insertion groove and formed to insert the fixing member inserted thereinto, wherein the seal insertion groove and the fixing member insertion groove communicates with each other.

The head and the body may be made of different kinds of materials.

In accordance with still yet another aspect, a brush seal assembly includes: a packing body configured to be positioned between a rotating body and a fixing body and provided with an insertion groove toward the rotating body; a brush seal part configured to include a brush extending to be inclined toward the rotating body in a state in which one end of the brush seal part is inserted into the insertion groove and a support member supporting the brush; a thermal expansion member configured to adhere to a side of the support member and thermally expanded only at front and rear end portions based on a length direction in the overall circumferential direction; and a fixing member configured to be inserted into an insertion groove to fix the brush seal part.

It is to be understood that both the foregoing general description and the following detailed description are exemplary and explanatory and are intended to provide further explanation of the invention as claimed.

BRIEF DESCRIPTION OF THE DRAWINGS

The above and other objects, features and other advantages will be more clearly understood from the following detailed description taken in conjunction with the accompanying drawings, in which.

DETAILED DESCRIPTION

In a steam or gas turbine, since the rotating body and the fixing body are applied with heat due to high-temperature steam introduced from a boiler, when the steam turbine is operated and the operation thereof stops, the steam turbine is expanded or contracted from several mm to tens of mm depending on a position. In this case, the rotating body and the fixing body are differently expanded due to different characteristics of a material and are expanded in a different direction depending on a structure of the turbine to cause the interference while the rotor and the stator are operated, and as a result, the rubbing may occur.

A labyrinth seal can be used to promote sealing. Also, a technology of applying a brush seal in which the brush is coupled with the labyrinth seal to remove the gap between the fixing body and the rotating body and promote sealing in a form which the stator and the rotor flexibly contact each other.

A configuration of a brush seal assembly according to a first exemplary embodiment will be described with reference to the accompanying drawings. For reference, FIG. 1 illustrates an example in which a labyrinth seal 10 and a brush seal assembly 1 is applied to a gap between a fixing body and a rotating body of a steam turbine.

Figure 1:
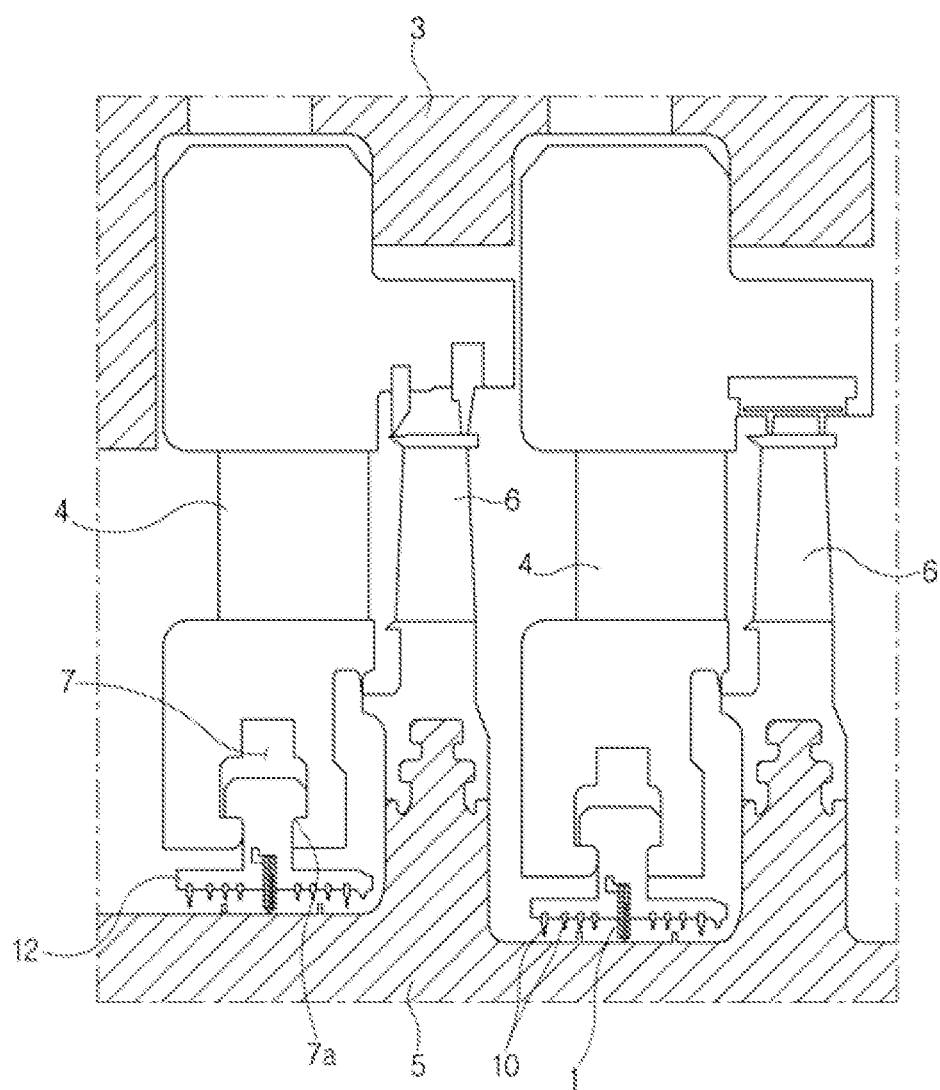
FIG. 1 is a cross-sectional view illustrating a state in which a brush seal assembly according to a first exemplary embodiment is positioned between a rotating body and a stating body.
Figure 2:
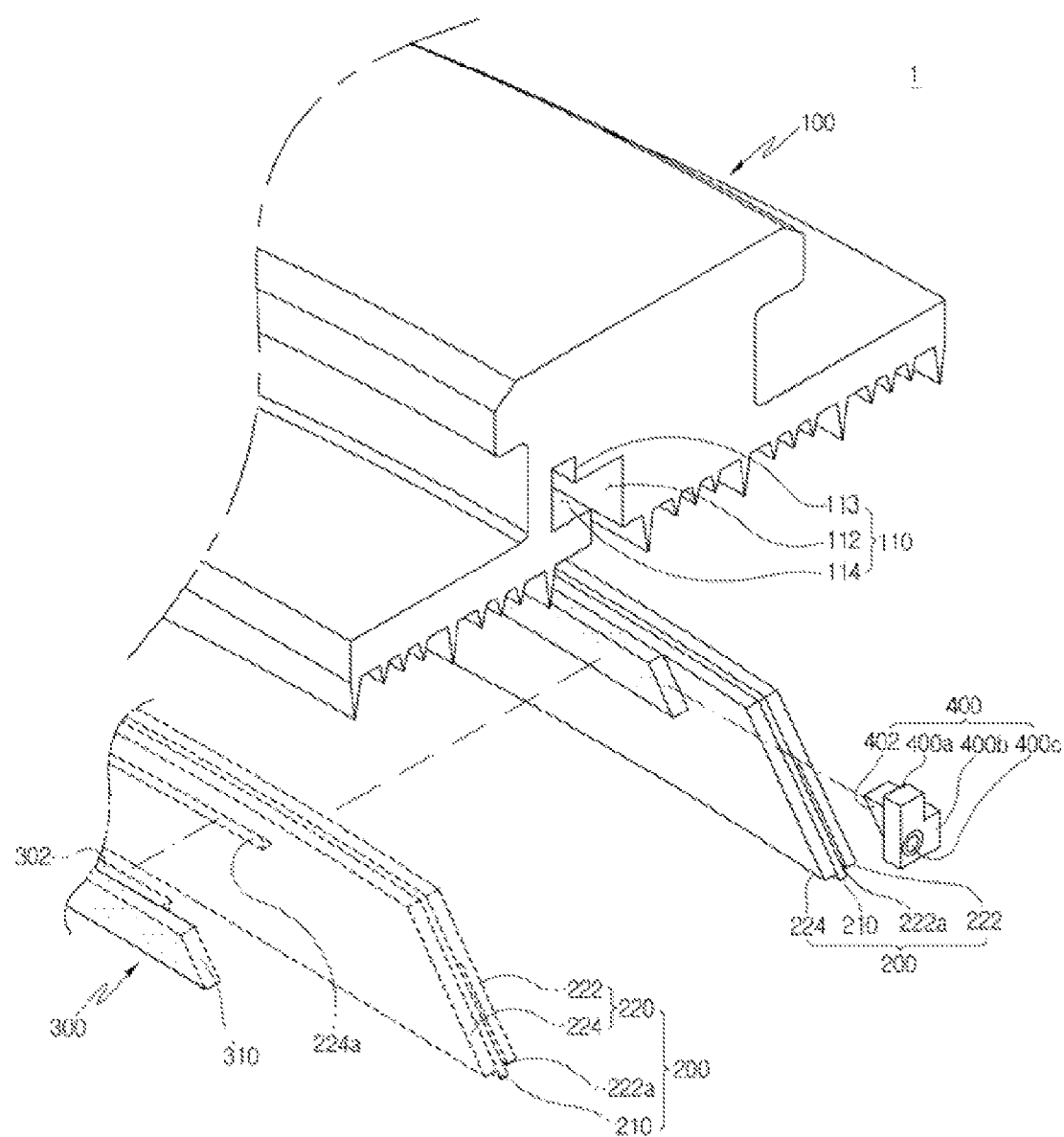
FIG. 2 is an exploded perspective view of the brush seal assembly according to the first exemplary embodiment.
Figure 3:
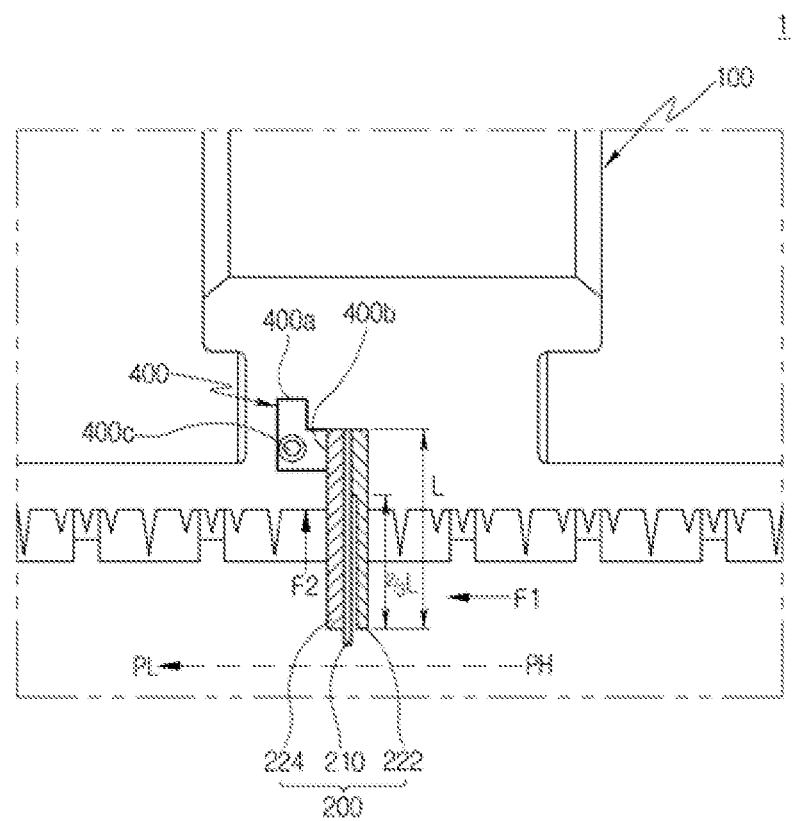
FIG. 3 is a coupled front view of the brush seal assembly according to the first exemplary embodiment.

Referring to FIGS. 1 to 3, the fixing body includes a casing 3 and a diaphragm 4 and the rotating body includes a rotor 5 and a bucket 6. The diaphragm 4 is coupled with the casing 3 and is dispose to be adjacent to the bucket 6 and the bucket 6 integrally shaft-rotates with the rotor 5 in the state in which it is adjacent to the diaphragm 4.

There is a need to seal between a gap between the diaphragm 4 and the bucket 6 and a gap between the diaphragm 4 and the rotor 5 for airtightness. For this purpose, the brush seal assembly 1 is used.

The brush seal assembly 1 is configured to include a packing body 100, brush seal parts 200, thermal expansion members 300, and fixing members 400, in which the brush seal parts 200 are fixed in a circumferential direction and a radial direction of the packing body 100 to allow the brush seal parts 200 to stably maintain airtightness between the rotor 5 rotating at a predetermined speed and the fixing body.

In this case, all the brush seal parts 200 is fixedly maintained in a length direction of the packing body 100 by the fixing member 400 depending on heat conduction transferred to the brush seal part 200 through the rotor 5 or is pressed inward or outward in a radial direction by the fixing member 400 to stably maintain the airtightness.

For this purpose, according to the exemplary embodiment, the packing body 100 which is positioned between the rotor 5 and the fixing body and is formed with an insertion groove 110 is positioned to face the rotor 5 and the packing body 100 is formed of a plurality of individual unit bodies and thus is assembled in a ring shape in the outer circumferential direction of the rotor 5.

That is, the plurality of packing bodies 100 having a predetermined length are installed outside the rotor 5 in the state in which they adhere to each other.

When all the brush seal parts 200 are inserted into the insertion grooves 110, the packing body 100 has the ring shape on the whole and the packing body is configured to include a seal insertion groove 112 and a fixing member insertion groove 114 into which a support member 220 is inserted, in which the seal insertion groove 112 and the fixing member insertion groove 114 are formed to communicate with each other.

The insertion groove 110 is opened in a shape corresponding to the fixing member 400 and according to the exemplary embodiment, the fixing member 400 is formed of a rectangular parallelepiped or polygonal block and therefore the fixing member insertion groove 114 also has a corresponding shape thereto.

The insertion groove 110 is not opened only for the insertion of the brush seal part 200, the seal insertion groove 110 for stably supporting the brush seal part 200 depending on a pressure of a high-pressure fluid in the state in which the brush seal part 200 is inserted into the insertion groove 110 is formed of a rectangular cross section form, and the fixing member insertion groove 114 into which the fixing member 400 is inserted has a polygonal cross section shape.

Due to the form, an inner circumferential surface of the fixing member insertion groove 114 and an outer circumferential surface of the fixing member 400 adhere to each other in a plurality of contact surfaces and thus a contact area is relatively increased and a friction surface is increased, such that a fixing force in the circumferential direction of the brush seal part 200 may be enhanced. Further, even when a pressing force due to a fluid is applied to the brush seal part 200, a position movement is not made and thus the fixing is stably maintained by the fixing member.

A stepped part 113 is formed between the seal insertion groove 110 and the fixing member insertion groove 114 and thus the insertion groove 110 may more stably fix the brush seal parts 200. In this case, some of upper surfaces of the brush seal parts 200 are supported to upper surfaces inside the stepped parts 113 and the brush seal parts are simultaneously supported by the fixing member 400, and therefore a deformation of the brush seal parts 200 due to the pressure of the fluid applied to the brush 210 is reduced and the support force depending on a pressure direction of the fluid applied to the brush seal parts 200 is enhanced, and therefore a phenomenon that a stress is concentrated on an end of the brush 210 may be reduced.

Therefore, even when the brush seal part 200 is directly or indirectly rubbed with the rotor 5 over a long period of time, a sealing loss due to abrasion and deformation is reduced and thus a constant gap may be maintained and the high-pressure fluid may constantly move through the brush 210, thereby reducing unnecessary fluid leaking flow.

In this case, some of the upper surfaces of the brush seal parts 200 are partially supported to inner sides of the stepped parts 113 and the brush seal parts 200 are simultaneously supported by the fixing member 400, and therefore the deformation of the brush seal parts 200 due to the pressure of the fluid applied to the brush 210 is reduced and the support force of the fixing member 400 depending on the pressure of the fluid applied to the brush seal parts 200 is enhanced, and therefore the phenomenon that a stress is concentrated an end of the brush 210 may be reduced.

Therefore, even when the brush seal part 200 is directly or indirectly rubbed with the rotor 5 over a long period of time, the sealing loss due to the abrasion and the deformation is reduced and the constant gap is maintained between the brush 210 and the rotor 5, such that a predetermined quantity of high-pressure fluid may move through the brush 210, thereby reducing an unnecessary fluid leaking flow.

In particular, when the gap between the rotor 5 and the brush 210 is excessively spaced apart from each other, the high-pressure fluid may be leaked and therefore the whole power loss of the rotor 5 may be caused.

Further, when the rotor 5 and the brush excessively adhere to each other, an interference may occur between the rotor 5 and the fixing body, and as a result, maintaining the gap between the rotor 5 and the brush 210 may be important.

The thermal expansion member 300 extends along a length direction of an upper surface of a second support plate 224 in an adhering state and receives heat transferred from the high-temperature fluid and thus is thermally expanded in the circumferential direction of the packing body 100.

In particular, according to the exemplary embodiment, when the thermal expansion member 300 is thermally expanded, the thermal expansion member 300 is thermally expanded in a longitudinal length and is pressed toward a lower portion of the packing body 100 by the fixing member 400 to be described below to press all the brush seal parts 200 in the radial direction.

That is, front and rear end portions of the brush seal part 200 are each fixed in the circumferential direction by the fixing member 400 and when the brush seal part 200 is thermally expanded in the radial direction, the brush seal part 200 is pressed in the radial direction by the fixing member 400 and thus maintains the stably fixed state both in the circumferential direction and the radial direction of the packing body 100.

In particular, when the heat conduction is made by the high-temperature fluid, the brush seal part 200 maintains in the stably fixed state in the circumferential direction and the radial direction and the predetermined quantity of high-pressure fluid moves through the brush 210, and as a result, the sealing efficiency may be enhanced and efficiency of an object mounted with the brush seal part 200 may be more stably maintained.

For example, when the rotor 5 is installed in the steam turbine, as described above, the high-temperature fluid moves through the brush seal part 200 and thus the brush seal part 200 is stably fixed in the packing body 100 by the thermal expansion member 300 and at the same time, the sealing is maintained in the circumferential direction and the radial direction, thereby reducing the fluid leaking flow which is unnecessarily leaked.

The thermal expansion member 300 is disposed to face the fixing member 400, and in more detail, an end of the thermal expansion member 300 and the fixing member 400 are maintained to be spaced apart from each other in consideration of a change in length depending on the expansion of the thermal expansion member 300.

For reference, the spaced length is not particularly limited, but when the thermal expansion member 300 is thermally expanded, the thermal expansion member 300 is preferably positioned at the adjacent position so that the pressing may be stably made in the radial direction by the fixing member 400.

The thermal expansion member 300 is provided with an inclined surface 310 inclined in one side direction toward the fixing member 400, in which the inclined surface 310 is inclined toward any one of the upper portion or the lower portion and an inclined angle and a length of the inclined surface 310 are not particularly limited but the inclined surface 310 is preferably inclined in a form illustrated in the drawings so that the pressing may be stably made by the front end portion of the fixing member 400.

The inclined surface 310 is preferably formed so that the front and rear end portions of the thermal expansion member 300 are inclined in the same form, such that when the thermal expansion member 300 is pressed by the fixing member 400, the brush seal parts 200 may move inward or outward in the radial direction of the packing body 100.

The thermal expansion member 300 is thermally expanded in the circumferential direction due to high-temperature heat conducted through the rotor 5 in the state in which it is inserted into the packing body and the inclined surface 310 may be formed in a form in which the front and rear end portions are inclined upward toward the fixing member 400.

An inclination direction of the inclined surface 310 determines the moving direction of the brush seal part 200 and when the inclined surface 310 is inclined downward, the brush seal part 200 moves inward in the radial direction of the packing body and when the inclined surface 310 is inclined upward, the brush seal part 200 moves outward in the radial direction of the packing body by the fixing member 400.

Therefore, the brush seal assembly according to the exemplary embodiment may easily move the brush seal parts 200 toward the rotor 5 to perform the stable sealing depending on the movement of the high-pressure fluid.

The thermal expansion member 300 includes an insertion part 302 which is inserted into a slot groove 224a and the insertion part 302 is formed only in some section of the thermal expansion member 300. The reason why the insertion part 302 is formed only in the some section is to stably perform the thermal expansion in the state in which it adheres to the second support plate 224 when the thermal expansion member 300 is thermally expanded in the length direction.

As such, the brush seal part 200 is pressed either inward or outward in the radial direction of the packing body 100 depending on how much the brush seal part 200 is thermally expanded.

When the high-pressure fluid is pressed toward the brush 210 at different pressures, the brush 210 may maintain the leaking flow of fluid in a stable state over a long period of time, thereby enhancing the efficiency of the object in which the brush seal assembly is installed.

For example, the control of the gap between the brush seal part 200 and the rotor 5 may maintain the gap relatively more constant than the case in which a lower end of the brush 210 is excessively bent. In this case, the inclined direction for the inclined surface of the thermal expansion member 300 may be set by a previous simulation for the gap between the brush 210 and the rotor 5 and a behavior of the brush 210 to configure the brush seal assembly, thereby stably maintaining the high-pressure fluid leakage by the brush 210.

The support member 220 includes a first support plate 222 which adheres to one side of the brush 210 and a second support plate 224 which adheres to the other side of the brush 210. The first support plate 222 is provided with a guide groove 222a to guide a flow of fluid from an inner side facing the brush 210 toward a lower portion of the brush 210 so as to induce the flow of the high-pressure fluid to the gap between the rotor 5 and the brush 210, thereby implementing the stable movement.

Therefore, when the high-pressure fluid moves to the brush 210 through the first support plate 222, an unnecessary eddy phenomenon may be reduced and the flow of fluid toward the lower end of the brush 210 may be induced.

For reference, a right pressure of the brush 210 is relatively higher than a left pressure of the brush 210, the flow of fluid moves from the right to the left, and the brush 210 prevents a fluid in a high-pressure region from being leaked to a low-pressure region.

In an embodiment, when the whole length of the first support plate 222 is set to be L, the guide groove 222*a* may be formed in an opened state at a height corresponding to, for example, ⅔ L from a lower portion. In an embodiment, when the height of the guide groove 222*a* is formed at a length which is less than half of L, it may be difficult to stably guide the high-pressure fluid and when the height of the guide groove 222*a* extends to a length of ⅔ L, stiffness of the first support plate 220 may be weakened. In such an embodiment, the guide groove 222*a* may be formed at the foregoing height.

In addition to the illustrated shape, a shape of the guide groove 222*a* may be changed to a rounded shape and may be set through the simulation depending on the movement of the high-pressure fluid.

The second support plate 224 adheres to an opposite side of the brush 210 in the state in which it faces the first support plate 222 and has a slot groove 224*a* provided one side thereof facing the thermal expansion member 300 to be described below. When the high-pressure fluid moves through the first support plate 222 and the brush 210, the first support plate 222 prevents the brush 210 from being deformed due to a pressure difference between the left and the right and maintains the brush 210 in the stable support state.

The thickness of the second support plate 224 is formed to correspond to that of the first support plate 220 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210. Further, the slot groove 224*a* may be formed at a position facing the thermal expansion member 300 to stably install and expand the thermal expansion member 300.

Figure 4:
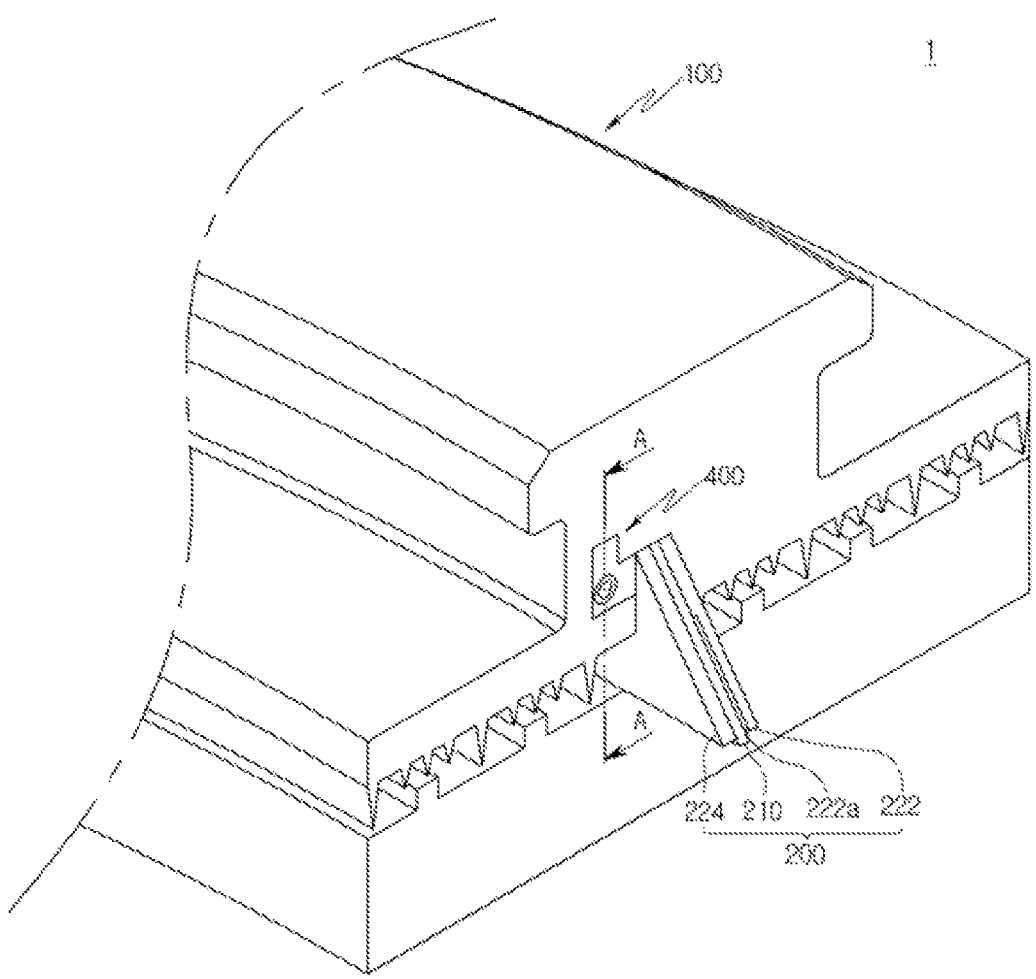
FIG. 4 is a coupled perspective view of the brush seal assembly according to the first exemplary embodiment.
Figure 5:
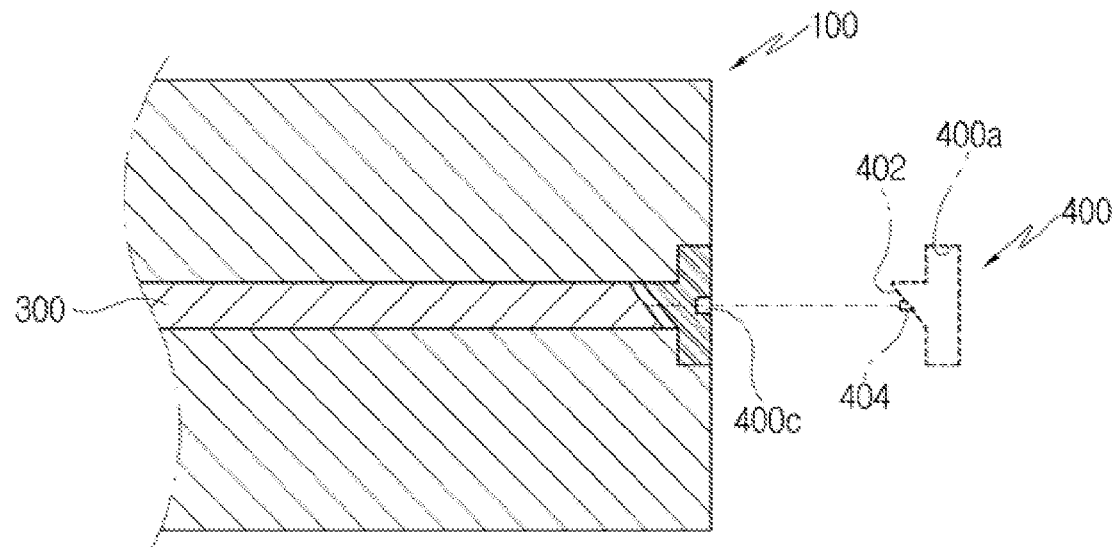
FIG. 5 is a cross-sectional view taken along the line A-A' of FIG. 4.

Referring to FIGS. 3 to 5, the fixing member 400 is formed in a convex shape and thus extends toward a horizontal direction or a vertical direction as much as a predetermined length and the fixing member 400 has a polygonal shape on the whole and is fitted in the fixing member insertion groove 114 in the state in which an outer circumferential surface of the fixing member based on the brush seal part 200 adheres to stably support the brush seal part 200 even when the high-pressure fluid applies a pressure to the brush seal part 200.

Describing in more detail, when the fluid moves toward the brush seal part 200 in an arrow direction, the pressure applied to the brush seal part 200 and the fixing member 400 is simultaneously applied in X-axis and Y-axis directions.

The pressure in the X-axis direction generates a force of F1 to move the brush seal part 200 and the fixing member 400 in the moving direction of the fluid and the pressure in the Y-axis direction generates a force of F2 to apply a force to move the brush seal part 200 and the fixing member 400 in directions of F1 and F2, respectively.

The fixing member 400 has a polygonal convex shape and therefore a portion formed of a horizontal surface or a vertical surface adheres to an inner circumferential surface of the seal insertion groove 112 even when a force is applied in the X-axis and Y-axis directions, respectively, thereby stably supporting it. As a result, the unnecessary occurrence of abrasion of the brush 210 may be reduced, the occurrence of vibration may be suppressed, and only the predetermined quantity of fluid may be guided to move through the brush seal part 200, thereby relatively enhancing the efficiency of the object in which the brush seal assembly is installed.

The fixing member 400 includes, for example, a first fixing body 400*a* and a second fixing body 400*b*, in which the first fixing body 400*a* extends toward a vertical direction while having a rectangular parallelepiped shape and the second fixing body 400*b* extends toward a horizontal direction while being orthogonal to the first fixing body 400*a*.

For reference, the fixing member 400 illustrated in the exemplary embodiment is an example of various polygonal shapes but is not limited to the shape illustrated in the drawings and therefore may be variously changed. Therefore, it is to be noted that the fixing member 400 is used in a form in which the inner circumferential surface of the fixing member insertion groove 114 and the outer circumferential surface of the fixing member 400 are fitted in a face-to-face.

For example, when an external force is applied to the fixing member 400 in a specific direction, the external force delivered through a polygonal face is supported by the packing body 100 which adheres to the first and second fixing bodies 400*a* and 400*b* and some of the external force is diffused through the packing body 100 and thus the external force applied to the fixing member 400 is maintained in a reduced state.

As a result, even when a load delivered to the fixing member 400 through the rotor 5 and a load applied by the fluid are simultaneously applied, all the brush seal parts 200 may be stably supported.

When the fixing member 400 is inserted into the fixing member insertion groove 114 and then the repair of the brush seal part 200 and the replacement of the brush 210 are required, a rear surface of the fixing member 400 is provided with a tool insertion groove 400*c* into which a tool may be inserted to allow a worker to conveniently separate the fixing member from the fixing member insertion groove 114.

The tool insertion groove 400*c* has either a circular shape or a polygonal shape but the shape of the tool insertion groove 400*c* is not particularly limited thereto, and therefore may be changed to various shapes in which the tool may be inserted.

As such, when the tool insertion groove 400*c* is formed in the fixing member 400, a worker may quickly separate the plurality of fixing members 400 inserted into the brush seal assembly 1 to enhance workability and the fixing member 400 may be conveniently inserted into the insertion groove 100 even at the time of re-assembling to perform the re-assembling.

The fixing member 400 includes a guide part 402 inclined toward an opposite direction to the inclined surface 310 in the state in which it faces the thermal expansion member 300, in which when the thermal expansion member 300 is thermally expanded in the circumferential direction, the guide part 402 guides the thermal expansion member 300 inward or outward in the radial direction in the state in which it adheres to the inclined surface, such that all the brush seal parts 200 and the rotor 5 may be maintained at a predetermined interval.

The guide part 402 is made of a material thermally expanded at a specific temperature to be thermally expanded toward the inclined surface, and therefore the material is not particularly limited.

The guide part 402 further includes a guide protrusion 404 which protrudes to an outside of a front surface thereof, in which the guide protrusion 404 minimally contacts the inclined surface 310 of the thermal expansion member 300 to reduce a stress applied to the fixing member 400. The guide protrusion 404 has a shape rounded toward the outside and a radius and a shape of the guide protrusion 404 are not particularly limited.

Unlike the foregoing shape, the insertion groove according to the exemplary embodiment is configured as follows to stably fix the brush seal part and more stably insert and fix the fixing member.

An insertion groove according to another exemplary embodiment will be described with reference to the accompanying drawings.

Figure 6:
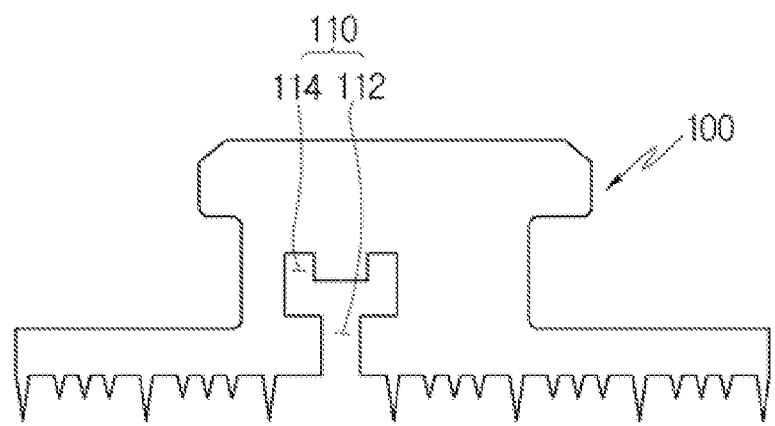
FIG. 6 is a diagram illustrating an insertion groove according to an exemplary embodiment.

Referring to FIG. 6, the insertion groove according to the exemplary embodiment is provided with the fixing member insertion grooves 114 in a form in which the fixing member insertion holes 114 are symmetrical to each other at the left and the right of the seal insertion groove 112, respectively, and the fixing member insertion grooves 114 are each coupled with the fixing members 400 to stably fix the brush seal part 200.

As such, when the fixing member insertion grooves 114 are disposed, the fixing member insertion grooves 114 are each supported at both sides of the brush seal part 200 by the fixing member 400 and thus the deformation of the brush seal part due to the pressure applied by the high-pressure fluid is reduced.

Further, the foregoing brush seal part 200 stably maintains a required support force maintenance performance condition and thus constantly maintains the sealed state even at the time of the long-term use to maintain a condition to stably supply a predetermined quantity of fluid toward the rotor 5, thereby enhancing the efficiency of the rotor 5.

The fixing member insertion groove may be formed on the upper surface of the brush seal part 200 and some section thereof may be each formed at the left and the right at the same time and the position of the fixed member insertion groove is selected by the simulation.

Figure 7:
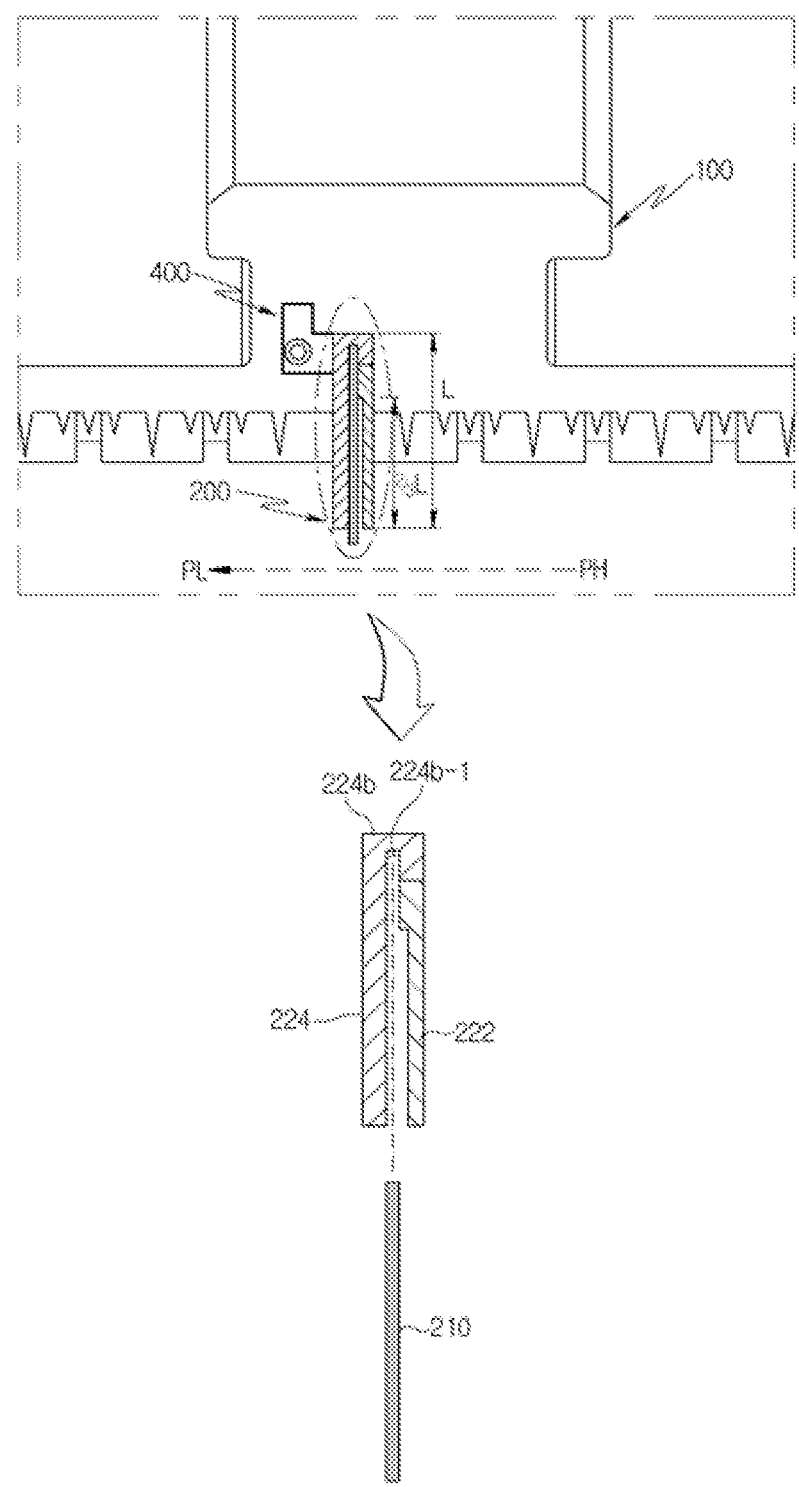
FIGS. 7 and 8 are front views illustrating an example of a packing body according to an exemplary embodiment.

Referring to FIG. 7, the second support plate 224 according to another exemplary embodiment includes an extension 224b which extends to the first support plate 222 through the upper surface of the brush 210. In this case, the upper surface of the brush 210 and the upper surface of the first support plate 222 are assembled in the state in which they adhere to a lower surface of the extension 224b and thus the brush 210 and the first support plate 222 are configured by be enclosed with the second support plate 224, thereby enhancing the assembling safety and enhancing the support force by the high-pressure fluid.

The second support plate 224 includes a position fixing groove 224b-1 in the extension 224b into which the upper end of the brush 210 is partially inserted, in which the position fixing groove 224b-1 fixes the brush 210 and constantly maintains the gap between the rotor 5 and the brush 210.

The brush 210 is made of a plurality of bristles and is configured in the state in which the first support plate 222 and the second support plate 224 based on the brush 210 adhere to each other and is configured to be inclined upward when being viewed from the top.

The reason is that the brush 210 is directly or indirectly rubbed with the rotor 5 and therefore the lower end of the brush 210 is not positioned in the packing body 100 in the vertical state to the rotor 5 but is positioned in the insertion groove 110 in the state inclined by 45 to reduce the stress applied from the rotor 5.

Figure 8:
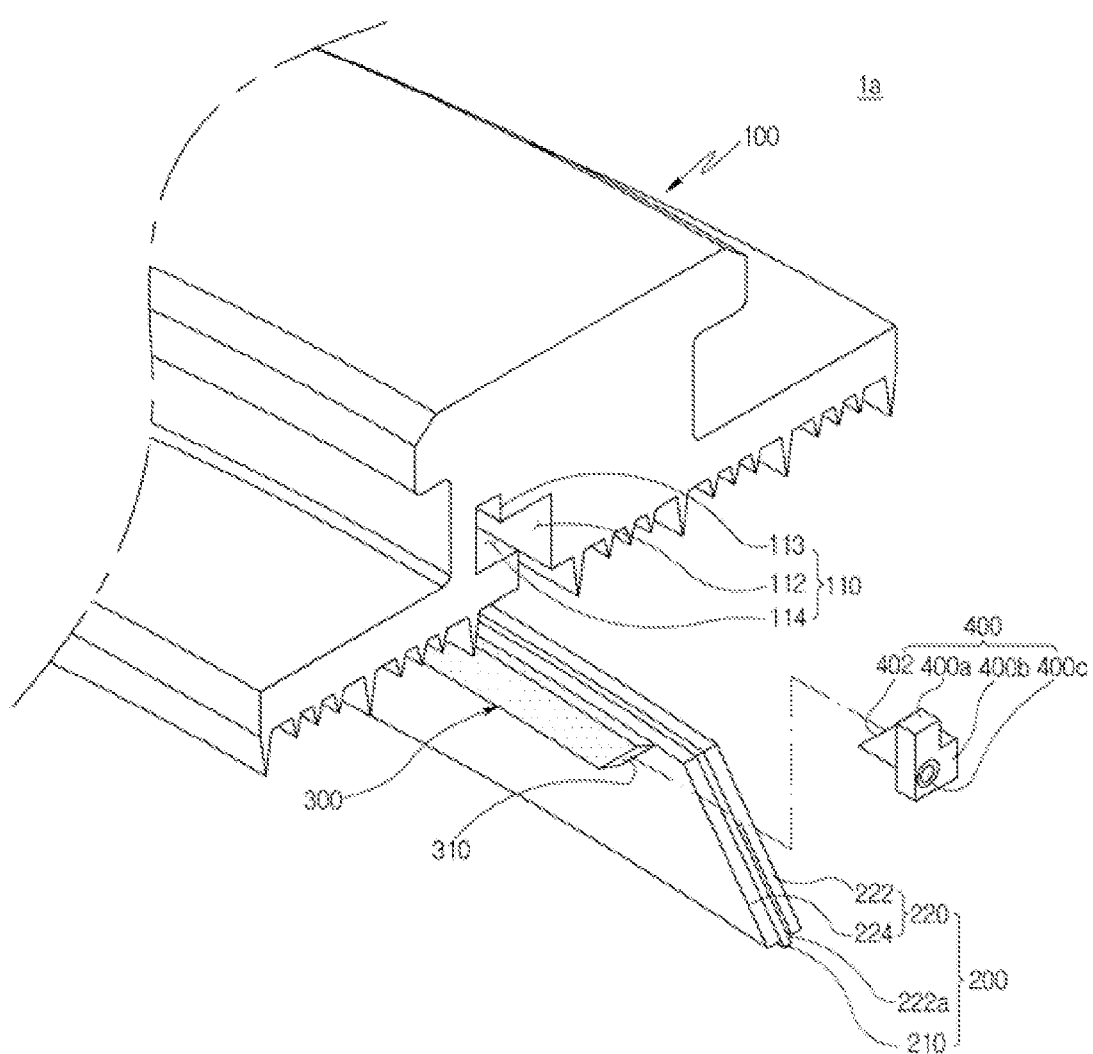

Referring to FIG. 8, a brush seal assembly 1a according to the exemplary embodiment may be used in the form in which the inclined surface 310 of the thermal expansion member 300 is inclined upward. In this case, the guide part 402 of the fixing member 400 is also configured in the form illustrated in the drawing to correspond to the state in which it adheres to the inclined surface 310. Further, the insertion groove 110, the brush seal part 200, the thermal expansion member 300, the fixing member 400 are similar to the foregoing description.

A configuration of a brush seal assembly according to a second exemplary embodiment will be described with reference to the accompanying drawings.

Figure 9:
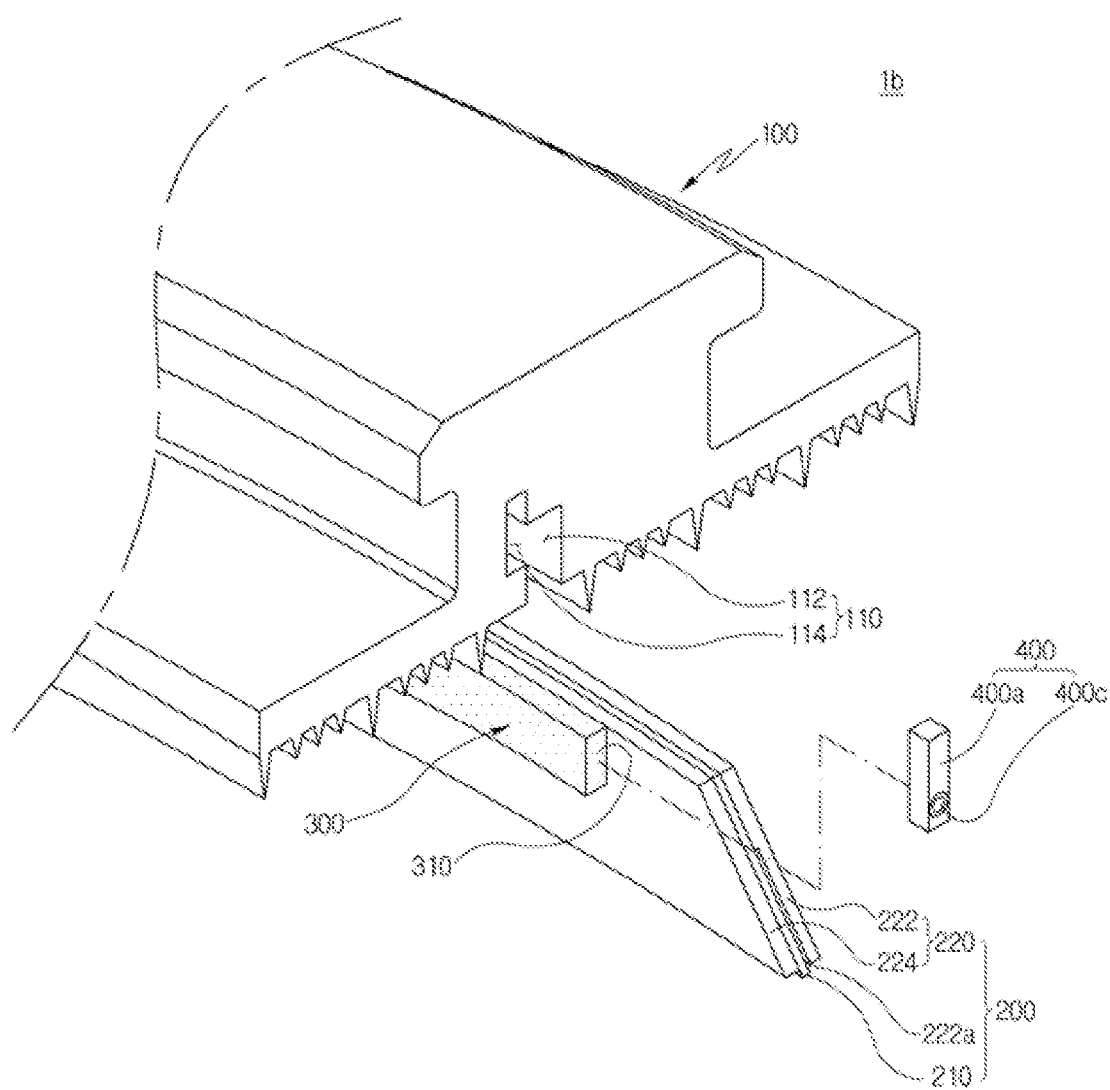
FIG. 9 is an exploded perspective view of a brush seal assembly according to a second exemplary embodiment.
Figure 10:
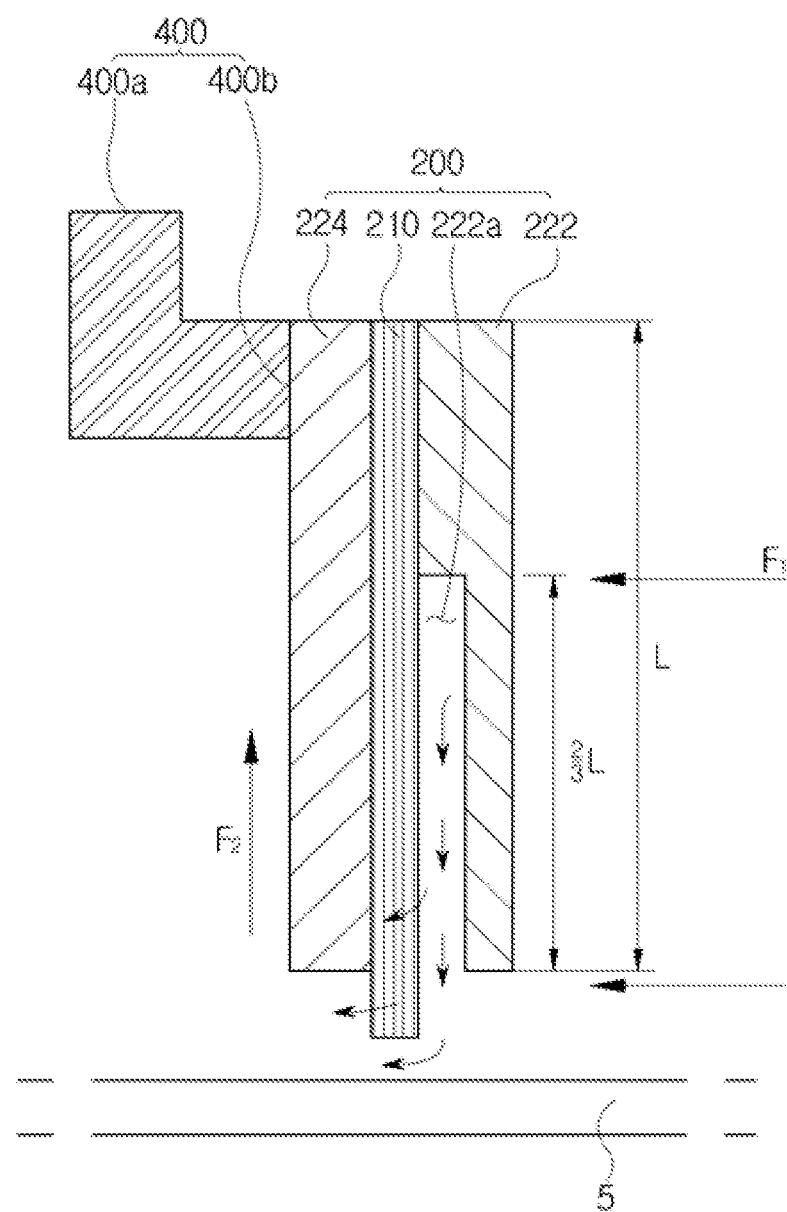
FIG. 10 is a diagram illustrating an example of a fluid moving to a brush seal part according to an exemplary embodiment and a pressure state applied to a brush seal through the rotating body.

Referring to FIGS. 9 and 10, a brush seal assembly 1b is configured to include the packing body 100, the brush seal part 200, the thermal expansion members 300, and the fixing members 400, in which the brush seal part 200 maintains the stable airtightness between the rotor 5 rotating at a predetermined speed and the fixing body and unlike the foregoing exemplary embodiment, according to the second exemplary embodiment, the fixed state of the brush seal part 200 is stably maintained in the circumferential direction of the packing body 100.

Further, the brush seal parts 200 are pressed inward or outward in the length direction or the radial direction of the packing body 100 by the fixing member 400 depending on the heat conduction transferred to the brush seal part 200 through the rotor 5 to maintain the airtightness.

For this purpose, according to the exemplary embodiment, the packing body 100 which is positioned between the rotor 5 and the fixing body and is formed with the insertion groove 110 is positioned to face the rotor 5 and the packing body 100 is formed of a plurality of individual unit bodies and thus is assembled in a ring shape in the outer circumferential direction of the rotor 5.

That is, the plurality of packing bodies 100 having the predetermined length are installed outside the rotor 5 in the state in which they are spaced apart from each other at a predetermined interval.

When the brush seal parts 200 are inserted into the insertion grooves 110, the packing body 100 has the ring shape on the whole and the packing body is configured to include a seal insertion groove 110 and the fixing member insertion groove 114 into which the support member 220 is inserted, in which the seal insertion groove 110 and the fixing member insertion groove 114 are formed to communicate with each other.

The insertion groove 110 is not opened only for the insertion of the brush seal part 200, the seal insertion groove 110 for stably supporting the brush seal part 200 depending on a pressure of a high-pressure fluid in the state in which the brush seal part 200 is inserted into the insertion groove 110 is formed of a rectangular cross section form, and the fixing member insertion groove 114 into which the support member 220 is inserted has a polygonal cross section shape.

The brush seal assembly 1b is configured to include the packing body 100 positioned between the rotor 5 and the fixing body and provided with the insertion groove 110 toward the rotor 5, the brush 210 extending to be inclined toward the rotor 5 in the state in which one end of the brush 210 is inserted into the insertion groove 110, a brush seal part 200 including the support member 220 which supports the brush 210, the thermal expansion members 300 adhering to both sides of the support member and thermally expanded in the circumferential direction of the packing body, and the fixing members 400 fitted in the insertion grooves 110 to fix the brush seal parts 200 and provided with the guide parts 402 to press the brush seal parts 200, which are thermally expanded toward each thermal expansion member 300 to adhere to the thermal expansion members 300, in the circumferential direction of the packing body.

The fixing member 400 has a convex shape and extends toward a horizontal direction or a vertical direction by a predetermined length and is fitted in the insertion groove 110 in the state in which the outer circumferential surface of the fixing member 400 based on the brush seal part 200 adheres to stably support the brush seal part 200 even when the high-pressure fluid applies a pressure to the brush seal part 200.

Describing in more detail, when the fluid moves toward the brush seal part 200 in an arrow direction, the pressure applied to the brush seal part 200 and the fixing member 400 is applied in an X-axis direction, and at the same time the pressure generated between the rotor 5 and the brush seal part 200 is applied in a Y-axis direction.

The pressure in the X-axis direction generates a force to move the brush seal part 200 and the fixing member 400 in the moving direction of the fluid and the pressure in the Y-axis direction generates a force to move the brush seal part 200 upward, and as a result, a force to move the brush seal part 200 and the fixing member 400 in the X-axis and Y-axis direction may be applied.

According to the exemplary embodiment, the fixing member 400 may have a polygonal block shape to stably maintain the force applied from the X-axis and Y-axis direction. As a result, the unnecessary occurrence of abrasion of the brush 210 may be reduced and only the predetermined quantity of fluid may be guided to move through the brush seal part 200, thereby relatively enhancing the efficiency of the object in which the brush seal assembly 1b is installed.

The fixing member 400 is an example of various polygonal shapes but is not limited to the shape illustrated in the drawings and therefore may be variously changed. Therefore, it is to be noted that the fixing member 400 is used in a form in which the inner circumferential surface of the fixing member insertion groove 114 and the outer circumferential surface of the fixing member 400 are fitted in a face-to-face.

When the fixing member 400 is inserted into the insertion groove 110 and then the repair of the brush seal part 200 and the replacement of the brush 210 are required, the rear surface of the fixing member 400 is further provided with a tool insertion groove 400c into which a tool may be inserted to allow a worker to conveniently separate the fixing member from the fixing member insertion groove 114, in which the tool insertion groove 400c may have either a circular shape or a polygonal shape but the shape of the tool insertion groove 400c is not particularly limited.

As such, when the tool insertion groove 400c is formed in the fixing member 400, a worker may quickly separate the plurality of fixing members 400 inserted into the brush seal assembly 1b to enhance workability and the fixing member 400 may be conveniently inserted into the fixing member insertion groove 114 even at the time of re-assembling to end the working.

The support member 220 includes the first support plate 222 which adheres to one side of the brush 210 and the second support plate 224 which adheres to the other side of the brush 210. The first support plate 222 is provided with a guide groove 222a to guide a flow of fluid from an inner side facing the brush 210 toward a lower portion of the brush 210 so as to induce the flow of the high-pressure fluid to the gap between the rotor 5 and the brush 210, thereby implementing the stable movement. Therefore, when the high-pressure fluid moves to the brush 210 through the first support plate 222, an unnecessary eddy phenomenon may be reduced and the flow of fluid toward the lower end of the brush 210 may be induced.

For reference, the right pressure of the brush 210 is relatively higher than the left pressure of the brush 210, the flow of fluid moves from the right to the left, and the brush 210 prevents a fluid in the high-pressure region from being leaked to the low-pressure region.

In an embodiment, when the whole length of the first support plate 222 is set to be L, the guide groove 222a may be formed in an opened state at a height corresponding to, for example, ⅔ L from a lower portion. In an embodiment, when the height of the guide groove 222a is formed at a length which is less than half of L, it may be difficult to stably guide the high-pressure fluid and when the height of the guide groove 222a extends to a length of ⅔ L, stiffness of the first support plate 220 may be weakened. In such an embodiment, the guide groove 222a may be formed at the foregoing height.

In addition to the illustrated shape, the shape of the guide groove 222a may be changed to the rounded shape and may be set through the simulation depending on the movement of the high-pressure fluid.

The second support plate 224 adheres to an opposite side of the brush 210 in the state in which it faces the first support plate 222 and has a slot groove (not illustrated) provided one side thereof facing the thermal expansion member 300 to be described below. When the high-pressure fluid moves through the first support plate 222 and the brush 210, the first support plate 222 prevents the brush 210 from being deformed due to a pressure difference between the left and the right and maintains the brush 210 in the stable support state.

The thickness of the second support plate 224 is formed to correspond to that of the first support plate 220 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210.

The thermal expansion member 300 extends along the length direction of the upper surface of a second support plate 224 in the adhering state and receives heat transferred from the high-temperature fluid and thus is thermally expanded in the circumferential direction of the packing body 100.

In particular, according to the exemplary embodiment, when the thermal expansion member 300 is thermally expanded, the thermal expansion member 300 is thermally expanded in a longitudinal length and is pressed in the circumferential direction of the packing body 100 by the fixing member 400 to be described below to press the brush seal parts 200.

That is, the front and rear end portions of the brush seal part 200 are fixed by the fixing member 400 in the circumferential direction.

In particular, when the heat conduction is made by the high-temperature fluid, the brush seal part 200 maintains in the stably fixed state in the circumferential direction and the predetermined quantity of high-pressure fluid moves through the brush 210, and as a result, the sealing efficiency may be enhanced and efficiency of an object mounted with the brush seal part 200 may be more stably maintained.

For example, when the rotor 5 is installed in the steam turbine, as described above, the high-temperature fluid moves through the brush seal part 200 and thus the brush seal part 200 is stably fixed in the packing body 100, and at the same time the sealing is stably maintained in the circumferential direction, thereby reducing the fluid leaking flow which is unnecessarily leaked.

The thermal expansion member 300 is disposed to face the fixing member 400, and in more detail, the end of the thermal expansion member 300 and the fixing member 400 are maintained to be spaced apart from each other in consideration of a change in length depending on the expansion of the thermal expansion member 300.

For reference, the spaced length is not particularly limited, but when the thermal expansion member 300 is thermally expanded, the thermal expansion member 300 is preferably positioned at the adjacent position so that the pressing may be stably made in the radial direction by the fixing member 400.

The thermal expansion member 300 according to the exemplary embodiment may be provided with the inclined surface 310 in a form inclined downward toward the fixing member 400, and the angle and the length of the inclined surface 310 are not particularly limited but the inclined surface 310 may be preferably inclined in the form illustrated in the drawing so that the pressing may be stably made by the front end portion of the fixing member 400.

The inclined surface 310 may be formed in the form in which the front and rear end portions of the thermal expansion member 300 are inclined in the same form, and thus when the thermal expansion member 300 is pressed by the fixing member 400, it may easily move in one direction.

As such, when the pressing is made in the circumferential direction of the packing body 100 depending on how much the brush seal part 200 is thermally expanded, the leaking flow of the fluid may be maintained over a long period of time in the stable state, thereby enhancing the efficiency of the object in which the brush seal assembly is installed.

For example, the control of the gap between the brush seal part 200 and the rotor 5 is relatively more advantageous to maintain the gap constant than the case in which a lower end of the brush 210 is excessively bent. In this case, the inclined direction for the inclined surface of the thermal expansion member 300 may be set by a previous simulation for the gap between the brush 210 and the rotor 5 and a behavior of the brush 210 to configure the brush seal assembly, thereby stably maintaining the high-pressure fluid leakage by the brush 210.

A brush seal assembly according to a third exemplary embodiment will be described with reference to the accompanying drawings.

Figure 11:
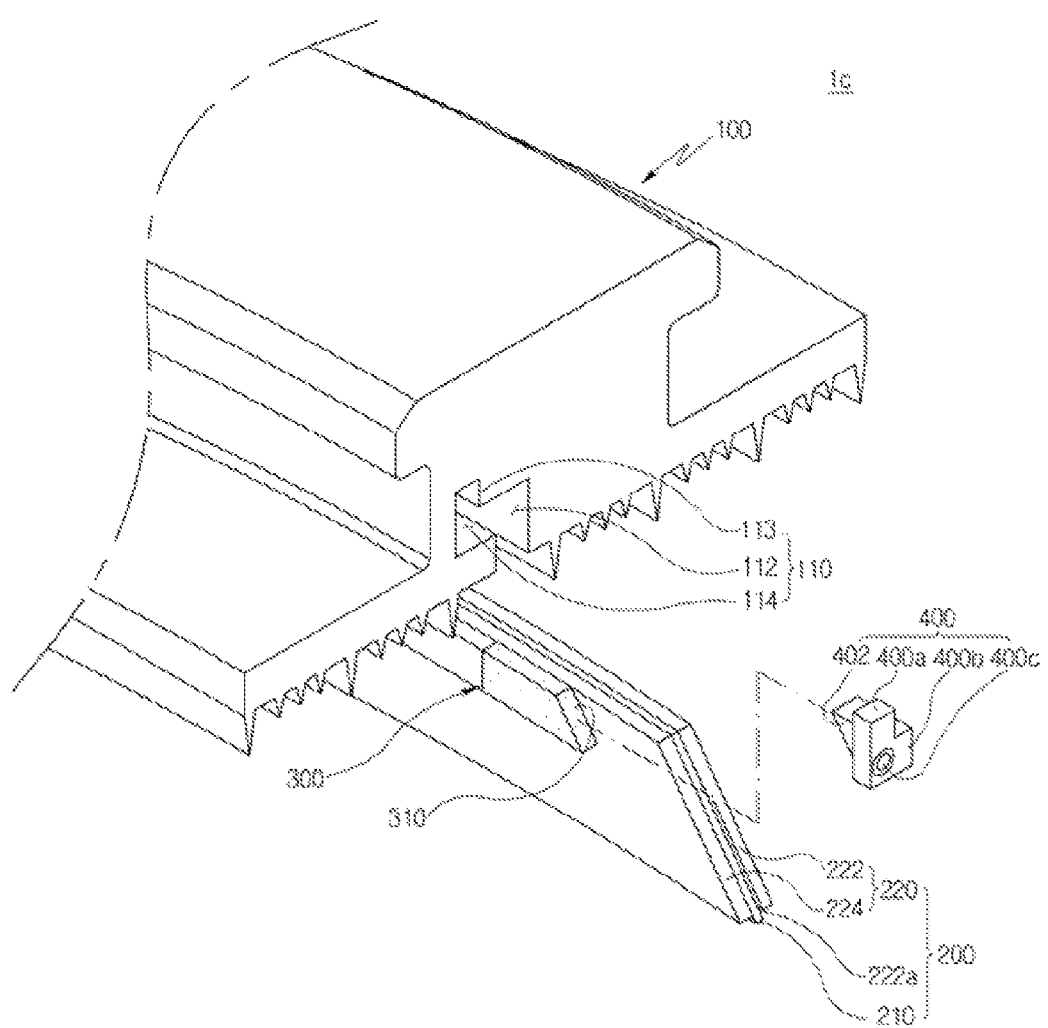
FIG. 11 is an exploded perspective view of a brush seal assembly according to a third exemplary embodiment.

Referring to FIG. 11, a brush seal assembly 1*c* is configured to include the packing body 100, the brush seal part 200, the thermal expansion members 300, and the fixing members 400, in which the brush seal part 200 maintains the stable airtightness between the rotor 5 rotating at a predetermined speed and the fixing body and the brush seal parts 200 are pressed inward or outward in the length direction or the radial direction of the packing body 100 by the fixing member 400 depending on the heat conduction transferred to the brush seal part 200 through the rotor 5 to maintain the airtightness.

For this purpose, according to the exemplary embodiment, the packing body 100 which is positioned between the rotor 5 and the fixing body and is formed with an insertion groove 110 is positioned to face the rotor 5 and the packing body 100 is formed of a plurality of individual unit bodies and thus is assembled in a ring shape in the outer circumferential direction of the rotor 5.

That is, the plurality of packing bodies 100 having the predetermined length are installed outside the rotor 5 in the state in which they are spaced apart from each other at a predetermined interval.

When the brush seal parts 200 are inserted into the insertion grooves 110, the packing body 100 has the ring shape on the whole and the packing body is configured to include a seal insertion groove 110 and the fixing member insertion groove 114 into which the fixing member 220 is inserted, in which the seal insertion groove 110 and the fixing member insertion groove 114 are formed to communicate with each other.

The insertion groove 110 is not opened only for the insertion of the brush seal part 200, the seal insertion groove 110 for stably supporting the brush seal part 200 depending on a pressure of a high-pressure fluid in the state in which the brush seal part 200 is inserted into the insertion groove 110 is formed of a rectangular cross section form, and the fixing member insertion groove 114 into which the fixing member 220 is inserted has a polygonal cross section shape.

For this purpose, The brush seal assembly according to the exemplary embodiment is configured to include the packing body 100 positioned between the rotor 5 and the fixing body and provided with the insertion groove 110 toward the rotor 5, the brush 210 extending to be inclined toward the rotor 5 in the state in which one end of the brush 210 is inserted into the insertion groove 110, a brush seal part 200 including the support member 220 which supports the brush 210, the thermal expansion members 300 adhering to sides of the support member 220 and partially thermally expanded in the length direction in the whole circumferential direction of the packing body 100, and the fixing member 400 fitted in the fixing member insertion groove 114 to fix the brush seal part 200 and provided with the guide part 402 for pressing the brush seal part 200 thermally expanded toward each thermal expansion member to adhere to the thermal expansion member in the circumferential direction and the radial direction of the packing body.

The fixing member 400 has a convex shape and extends toward the horizontal direction or the vertical direction by a predetermined length and is fitted in the insertion groove 110 in the state in which the outer circumferential surface of the fixing member 400 based on the brush seal part 200 adheres to stably support the brush seal part 200 even when the high-pressure fluid applies a pressure to the brush seal part 200.

According to the exemplary embodiment, the fixing member 400 may have a polygonal block shape to stably maintain the force applied from the X-axis and Y-axis direction. As a result, the unnecessary occurrence of abrasion of the brush 210 may be reduced, the occurrence of vibration and noise may be suppressed, and only the predetermined quantity of fluid may be guided to move through the brush seal part 200, thereby relatively enhancing the efficiency of the object in which the brush seal assembly is installed.

The fixing member 400 includes, for example, a first fixing body 400*a* and a second fixing body 400*b*, in which the first fixing body 400*a* extends toward a vertical direction and the second fixing body 400*b* extends toward a horizontal direction while being orthogonal to the first fixing body 400*a*.

For reference, the fixing member 400 illustrated in the exemplary embodiment is an example of various polygonal shapes but is not limited to the shape illustrated in the drawings and therefore may be variously changed. Therefore, it is to be noted that the fixing member 400 is used in a form in which the inner circumferential surface of the fixing member insertion groove 110 and the outer circumferential surface of the fixing member 400 are fitted in a face-to-face.

When the fixing member 400 is inserted into the fixing member insertion groove 114 and then the repair of the brush seal part 200 and the replacement of the brush 210 are required, the rear surface of the fixing member 400 is further provided with a tool insertion groove 400c into which a tool may be inserted to allow a worker to conveniently separate the fixing member from the fixing member insertion groove 114, in which the tool insertion groove 400c may have either a circular shape or a polygonal shape but the shape of the tool insertion groove 400c is not particularly limited.

As such, when the tool insertion groove 400c is formed in the fixing member 400, a worker may quickly separate the plurality of fixing members 400 inserted into the brush seal assembly to enhance workability and the fixing member 400 may be conveniently inserted into the insertion groove 110 even at the time of re-assembling to end the working.

The thermal expansion member 300 extends along the length direction of the upper surface of a second support plate 224 in the adhering state and receives heat transferred from the high-temperature fluid and thus is partially thermally expanded in the circumferential direction of the packing body 100.

In particular, according to the exemplary embodiment, when the thermal expansion member 300 is thermally expanded, the thermal expansion member 300 is thermally expanded in a longitudinal length and is pressed toward a lower portion of the packing body 100 by the fixing member 400 to be described below to press the brush seal parts 200 in the radial direction.

That is, the front and rear end portions of the brush seal part 200 are each fixed by the fixing member 400 in the circumferential direction based on the brush seal part 200 and when the brush seal part 200 is thermally expanded in the radial direction, the brush seal part 200 is pressed in the radial direction by the fixing member 400 and thus maintains the stably fixed state both in the circumferential direction and the radial direction of the packing body 100.

Further, the thermal expansion member 300 according to an exemplary embodiment is not thermally expanded in the whole length direction but thermally expanded in the length direction only in the front and rear end portions. As such, the case in which the thermal expansion is made only in the specific section may have improved responsiveness than the case in which the thermal expansion is made in the whole length, and thus the operation may be performed more quickly.

In more detail, the intermediate section in the length direction of the thermal expansion member 300 is made of a general material and thus may not be thermally expanded and only the front and rear end portions of the thermal expansion member 300 is made of a material which is thermally expanded and thus may be thermally expanded, in which the thermal expansion member is disposed to face the fixing member 400.

In particular, the brush seal assembly 1c is pressed in the radial direction in both directions of the front and rear end portions of the brush seal part 200 by the fixing member 400 and is pressed either inward or outward based on the packing body 100 and therefore may be selectively installed so as to meet a condition that the internal expansion or the external expansion of the packing body 100 is made depending on the operation state of the object in which the brush seal assembly 1c is installed.

The support member 220 includes the first support plate 222 which adheres to one side of the brush 210 and the second support plate 224 which adheres to the other side of the brush 210. The first support plate 222 is provided with the guide groove 222a to guide the flow of fluid from the inner side facing the brush 210 toward the lower portion of the brush 210 so as to induce the flow of the high-pressure fluid to the gap between the rotor 5 and the brush 210, thereby implementing the stable movement. Therefore, when the high-pressure fluid moves to the brush 210 through the first support plate 222, the unnecessary eddy phenomenon may be reduced and the flow of fluid toward the lower end of the brush 210 may be induced.

For reference, the right pressure of the brush 210 is relatively higher than the left pressure of the brush 210, the flow of fluid moves from the right to the left, and the brush 210 prevents a fluid in the high-pressure region from being leaked to the low-pressure region.

The guide groove 222a is similar to FIG. 3 and therefore is described with reference to FIG. 3. In an embodiment, when the whole length of the first support plate 222 is set to be L, the guide groove 222a may be formed in an opened state at a height corresponding to, for example, ⅔ L from a lower portion. In an embodiment, when the height of the guide groove 222a is formed at a length which is less than half of L, it may be difficult to stably guide the high-pressure fluid and when the height of the guide groove 222a extends to a length of ⅔ L, stiffness of the first support plate 220 may be weakened. In such an embodiment, the guide groove 222a may be formed at the foregoing height.

In addition to the illustrated shape, a shape of the guide groove 222a may be changed to the rounded shape and may be optimally set through the simulation depending on the movement of the high-pressure fluid.

The second support plate 224 adheres to an opposite side of the brush 210 in the state in which it faces the first support plate 222 and has a slot groove (see FIG. 2) provided one side thereof facing the thermal expansion member 300 to be described below. When the high-pressure fluid moves through the first support plate 222 and the brush 210, the first support plate 222 prevents the brush 210 from being deformed due to a pressure difference between the left and the right and maintains the brush 210 in the stable support state.

The thickness of the second support plate 224 is formed to correspond to that of the first support plate 220 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210. Further, the slot groove (not illustrated) may be formed at a position facing the thermal expansion member 300 to stably install and expand the thermal expansion member 300.

A brush seal assembly according to a fourth exemplary embodiment will be described with reference to the accompanying drawings.

Figure 12:
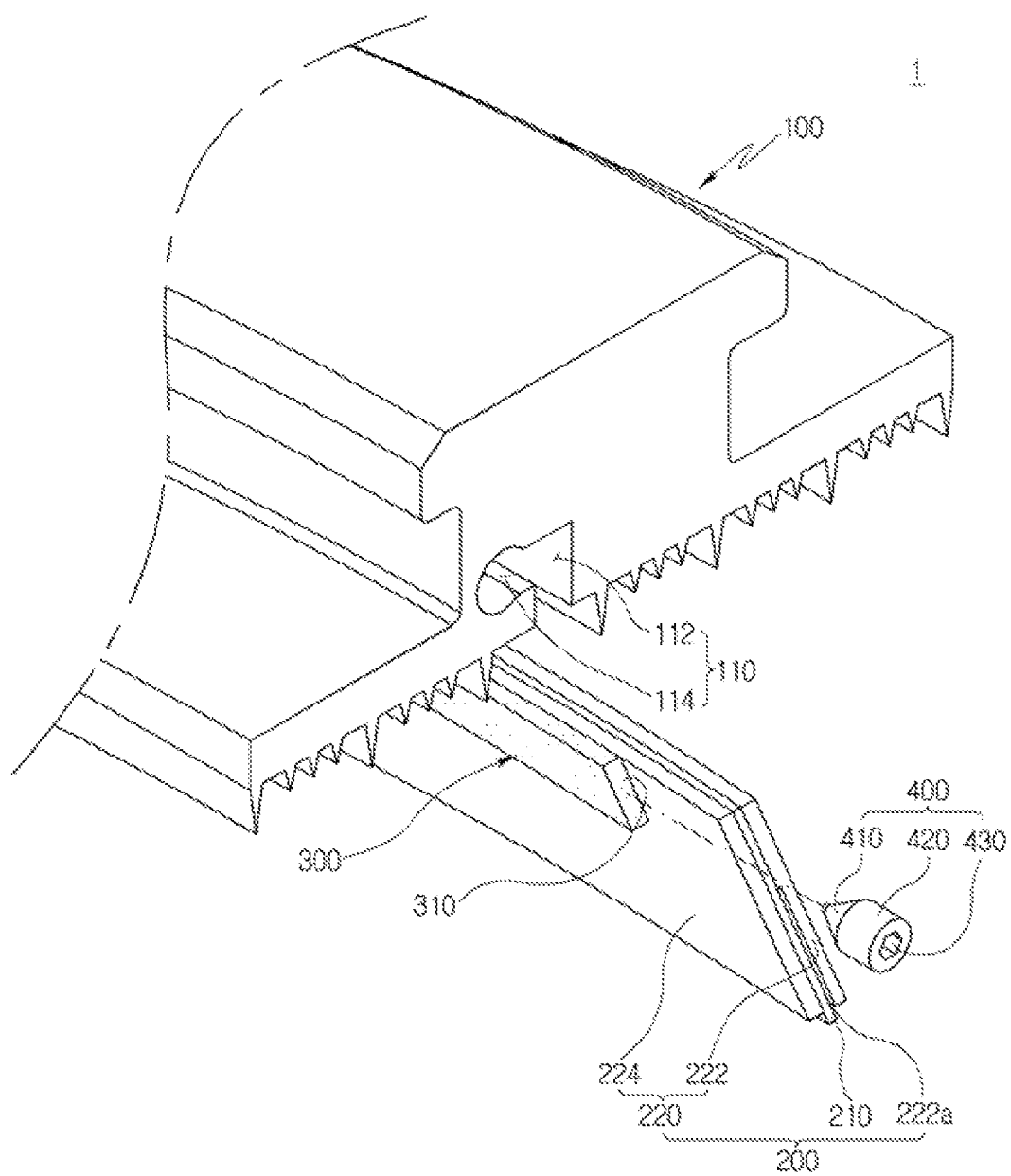
FIG. 12 is an exploded perspective view of a brush seal assembly according to a fourth exemplary embodiment.
Figure 13:
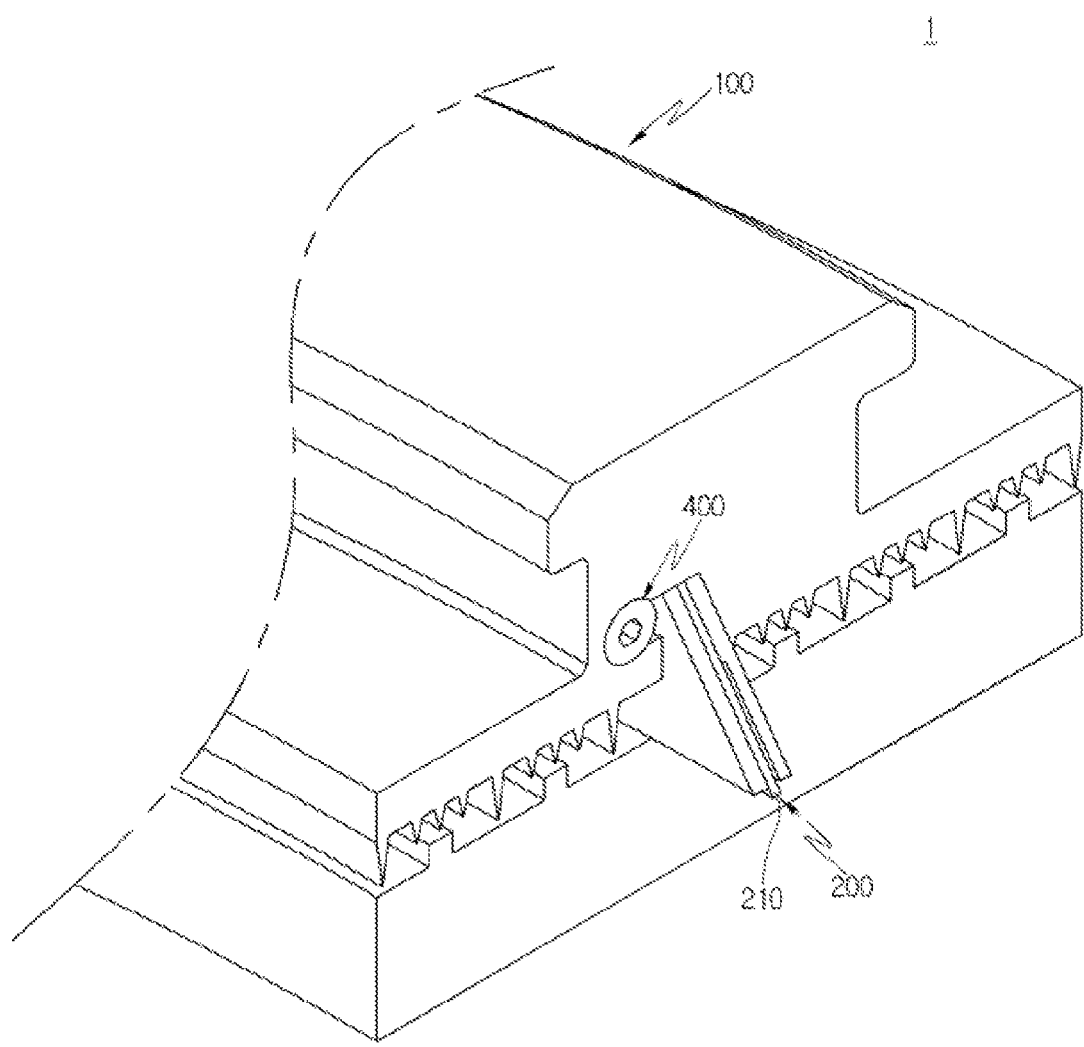
FIG. 13 is a coupled perspective view of FIG. 12.

Referring to FIG. 1 or FIGS. 12 and 13, the fixing body includes the casing 3 and the diaphragm 4 and the rotating body includes the rotor 5 and the bucket 6. The diaphragm 4 is coupled with the casing 3 and is dispose to be adjacent to the bucket 6 and the bucket 6 integrally shaft-rotates with the rotor 5 in the state in which it is adjacent to the diaphragm 4. There is a need to seal between a gap between the diaphragm 4 and the bucket 6 and the gap between the diaphragm 4 and the rotor 5 for airtightness. For this purpose, the brush seal assembly 1 is used.

The brush seal assembly 1 is configured to include the packing body 100, the brush seal part 200, the thermal expansion members 300, and the fixing members 400, in which the brush seal part 200 stably maintains the airtightness between the rotor 5 rotating at a predetermined speed and the fixing body.

In this case, the brush seal parts 200 are fixedly maintained in the length direction of the packing body 100 by the fixing member 400 depending on heat conduction transferred to the brush seal part 200 through the rotor 5 or is pressed inward or outward in the radial direction by the fixing member 400 to stably maintain the airtightness.

For this purpose, according to the exemplary embodiment, the packing body 100 which is positioned between the rotor 5 and the fixing body and is formed with the insertion groove 110 is positioned to face the rotor 5 and the packing body 100 is formed of the plurality of individual unit bodies and thus is assembled in a ring shape in the outer circumferential direction of the rotor 5. That is, the plurality of packing bodies 100 having a predetermined length are installed outside the rotor 5 in the state in which they adhere to each other.

When the packing body 100 is assembled in the state in which the brush seal parts 200 are inserted into the insertion groove 110, the packing body 100 has the ring shape on the whole and the packing body is configured to include the seal insertion groove 112 and the fixing member insertion groove 114 into which the fixing member 400 is inserted, in which the seal insertion groove 112 and the fixing member insertion groove 114 are formed to communicate with each other.

The insertion groove 110 is not opened only for the insertion of the brush seal part 200, the seal insertion groove 112 for stably supporting the brush seal part 200 depending on a pressure of a high-pressure fluid in the state in which the brush seal part 200 is inserted into the insertion groove 110 is formed of a rectangular cross section form, and the fixing member insertion groove 114 into which the fixing member 400 is inserted has a circular cross section shape.

The insertion groove according to the exemplary embodiment is configured as follows to stably fix the brush seal part and stably insert and fix the fixing member.

Figure 14:
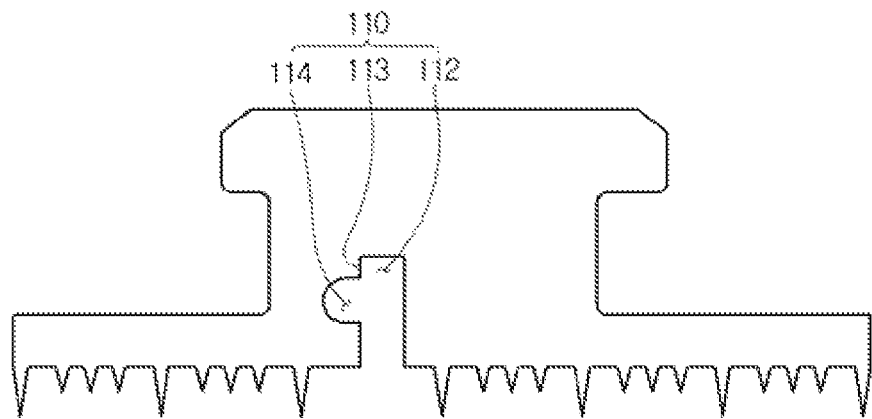
FIG. 14 is a front view of a packing body according to a fourth exemplary embodiment.

Referring to FIG. 14, the insertion groove 110 is formed in the circumferential direction inside the packing body 100 and includes the seal insertion groove 112 into which the brush seal part 200 is inserted, the stepped part 113 stepped in one side direction of the seal insertion groove 112, and the fixing member insertion groove 114 formed to insert the fixing member 400 into the lower portion of the stepped part 113.

In particular, according to the exemplary embodiment, the stepped part 113 may be formed between the seal insertion groove 112 and the fixing member insertion groove 114 and may more stably fix the brush seal parts 200.

In this case, some of the upper surfaces of the brush seal parts 200 are supported to the inner sides of the stepped parts 113 and the brush seal parts 200 are simultaneously supported by the fixing member 400, and therefore the deformation of the brush seal parts 200 due to the pressure of the fluid applied to the brush 210 is reduced and the support force of the fixing member 400 depending on the pressure of the fluid applied to the brush seal parts 200 is enhanced, and therefore the phenomenon that a stress is concentrated the end of the brush 210 may be reduced.

Therefore, even when the brush seal part 200 is directly or indirectly rubbed with the rotor 5 over a long period of time, the sealing loss due to the abrasion and the deformation is reduced and the constant gap is maintained between the brush 210 and the rotor 5, such that a predetermined quantity of high-pressure fluid may move through the brush 210, thereby reducing an unnecessary fluid leaking flow.

In particular, when the gap between the rotor 5 and the brush 210 is excessively spaced apart from each other, the high-pressure fluid may be leaked and therefore the whole power loss of the rotor 5 may be caused.

Further, when the rotor 5 and the brush excessively adhere to each other, an interference may occur between the rotor 5 and the fixing body, and as a result, maintaining the gap between the rotor 5 and the brush 210 may be important.

An insertion groove according to another exemplary embodiment will be described with reference to the accompanying drawings.

Figure 15:
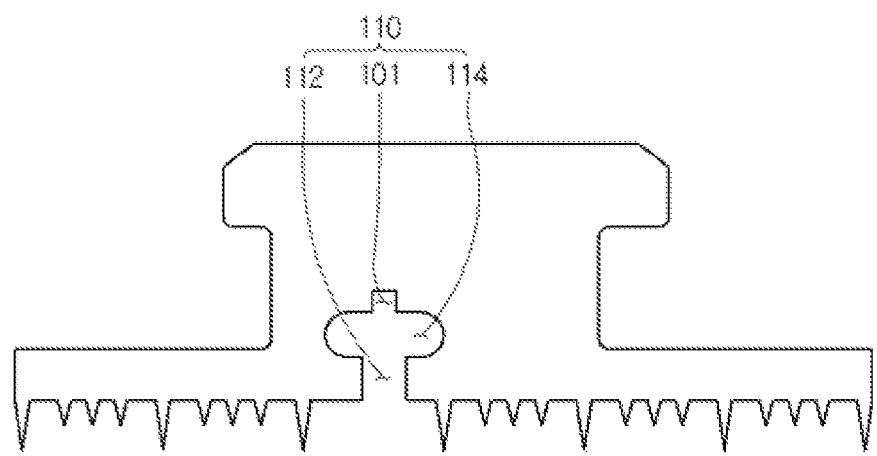
FIG. 15 is a front view of a packing body according to another exemplary embodiment.

Referring to FIG. 15, the insertion groove is provided with the fixing member insertion grooves 114 in a form in which the fixing member insertion holes 114 are symmetrical to each other at the left and the right of the seal insertion groove 112, respectively and the fixing member insertion grooves 114 are each coupled with the fixing members 400 (see FIG. 12) to stably fix the brush seal part 200.

As such, when the fixing member insertion grooves 114 are disposed, the fixing member insertion grooves 114 are each supported at both sides of the brush seal part 200 by the fixing member 400 and thus the deformation of the brush seal part 200 due to the change in the pressure applied by the high-pressure fluid is reduced. Further, the foregoing brush seal part 200 stably maintains the required support force maintenance performance condition and thus constantly maintains the sealed state even at the time of the long-term use to stably supply a predetermined quantity of fluid toward the rotor 5, thereby enhancing the efficiency of the rotor 5.

The fixing member insertion grooves 114 may be each formed on the upper surface of the brush seal part 200 and the left and the right at the same height or may be formed at a position spaced downward and the position of the fixing member insertion groove 114 is selected by the simulation.

Further, the packing body 100 is provided with an opening groove 101 in which the upper end of the brush seal part 200 is partially inserted and thus the upper end of the foregoing brush seal part 200 may be inserted in the adhering state and the upper end of the brush 210 is maintained in the stably inserted state and thus the support force depending on the change in the high-pressure fluid is enhanced, such that the stable support state may be maintained against the stress of the rotor 5 applied from the length direction of the brush 210 and the stress due to the high-pressure fluid applied from the side of based on the brush 210.

Figure 16:
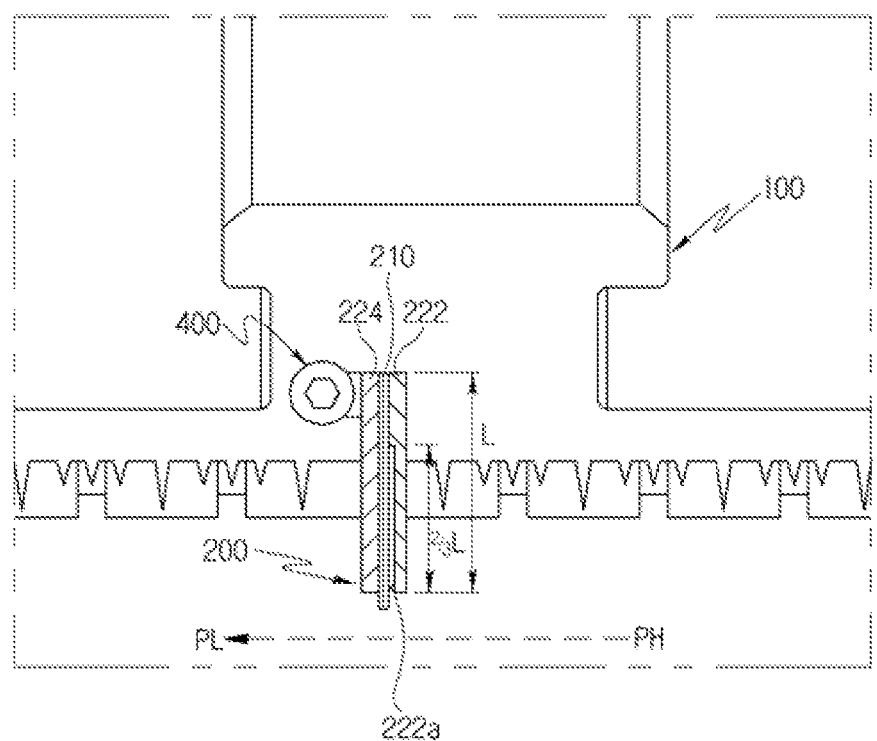
FIG. 16 is a front view of a brush seal assembly according to a fourth exemplary embodiment.

Referring to FIG. 16, the support member 220 includes the first support plate 222 which adheres to one side of the brush 210 and the second support plate 224 which adheres to the other side of the brush 210. The first support plate 222 is provided with the guide groove 222a to guide the flow of fluid from the inner side facing the brush 210 toward the lower portion of the brush 210 so as to induce the flow of the high-pressure fluid to the gap between the rotor 5 and the brush 210, thereby implementing the stable movement. Therefore, when the high-pressure fluid moves to the brush 210 through the first support plate 222, the unnecessary eddy phenomenon may be reduced and the flow of fluid toward the lower end of the brush 210 may be induced.

For reference, the right pressure of the brush 210 is relatively higher pressure PH than the left pressure of the brush 210, the left of the brush 210 corresponds to a low pressure PL, the fluid of the fluid moves from the right to the left as illustrated by a dotted arrow, and the brush 210 prevents the fluid in the high-pressure region from being leaked to the low-pressure region.

In an embodiment, when the whole length of the first support plate 222 is set to be L, the guide groove 222a may be formed in an opened state at a height corresponding to, for example, ⅔ L from a lower portion. In an embodiment, when the height of the guide groove 222a is formed at a length which is less than half of L, it may be difficult to stably guide the high-pressure fluid and when the height of the guide groove 222a extends to a length of ⅔ L, stiffness of the first support plate 220 may be weakened. In such an embodiment, the guide groove 222a may be formed at the foregoing height.

In addition to the illustrated shape, the shape of the guide groove 222a may be changed to the rounded shape and may be optimally set through the simulation depending on the movement of the high-pressure fluid.

The second support plate 224 adheres to an opposite side of the brush seal part 200 in the state in which it faces the first support plate 222 and has a slot groove 224a (see FIG. 8) provided one side thereof facing the thermal expansion member 300 to be described below. When the high-pressure fluid moves through the first support plate 222 and the brush 210, the first support plate 222 prevents the brush 210 from being deformed due to the pressure difference between the left and the right and maintains the brush 210 in the stable support state.

The thickness of the second support plate 224 is formed to correspond to that of the first support plate 220 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210. Further, the slot groove 224a (see FIG. 8) may be formed at a position facing the thermal expansion member 300 to stably install and expand the thermal expansion member 300.

Figure 17:
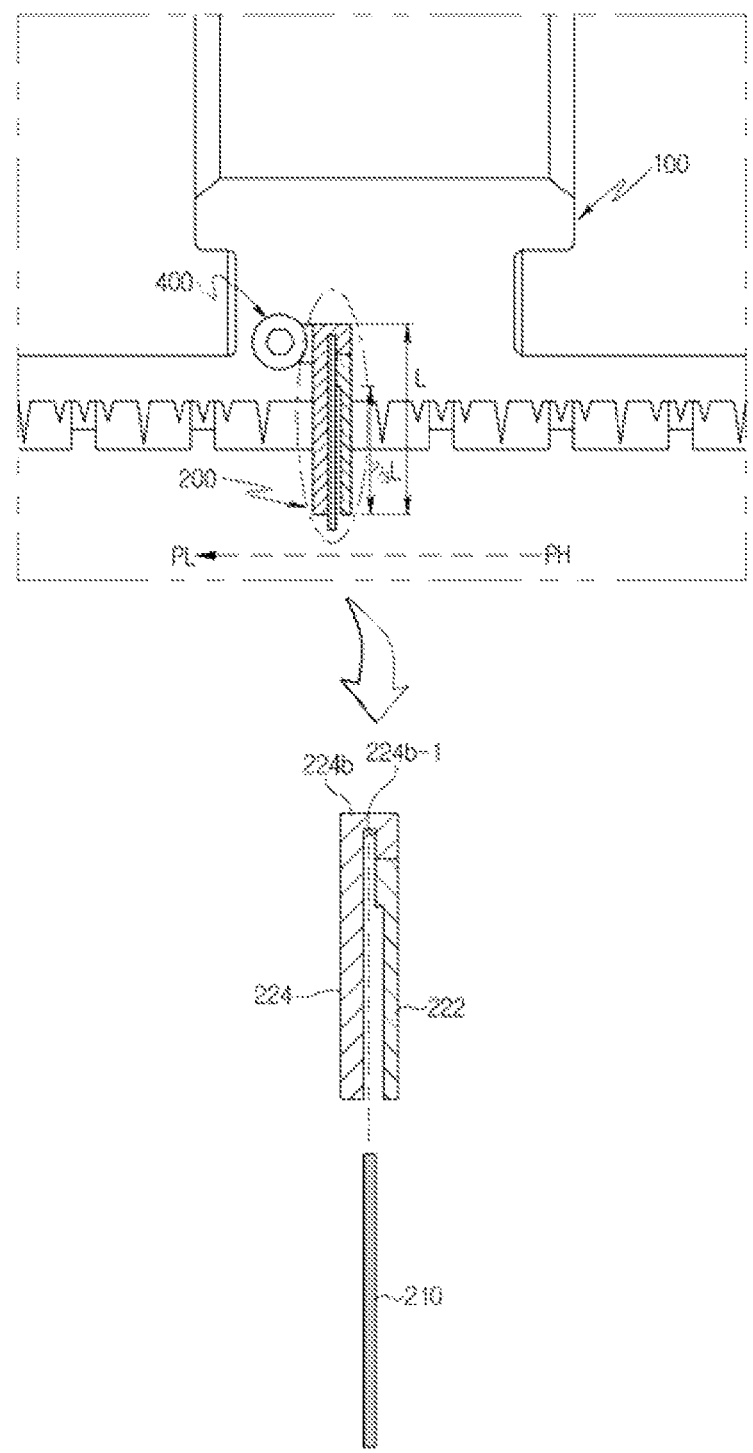
FIG. 17 is a front view of a brush seal assembly according to another exemplary embodiment.

Referring to FIG. 17, the second support plate 224 according to another exemplary embodiment includes the extension 224b which extends to the first support plate 222 through the upper surface of the brush 210. In this case, the upper surface of the brush 210 and the upper surface of the first support plate 222 are assembled in the state in which they adhere to a lower surface of the extension 224b and thus the brush 210 and the first support plate 222 are configured by be enclosed with the second support plate 224, thereby enhancing the assembling safety and enhancing the support force by the high-pressure fluid.

The second support plate 224 includes a position fixing groove 224b-1 in the extension 224b into which the upper end of the brush 210 is partially inserted, in which the position fixing groove 224b-1 fixes the brush 210 and constantly maintains the gap between the rotor 5 and the brush 210.

The brush 210 is made of a plurality of bristles and is configured in the state in which the first support plate 222 and the second support plate 224 adhere to each other based on the brush 210 and is configured to be inclined upward when being viewed from the top.

The reason is that the brush 210 is directly or indirectly rubbed with the rotor 5 and therefore the stress is continuously applied to the brush 210, such that the lower end of the brush 210 is not positioned in the packing body 100 in the vertical state to the rotor 5 but is positioned in the insertion groove 110 in the state inclined by 45 to reduce the stress applied from the rotor 5.

Figure 18:
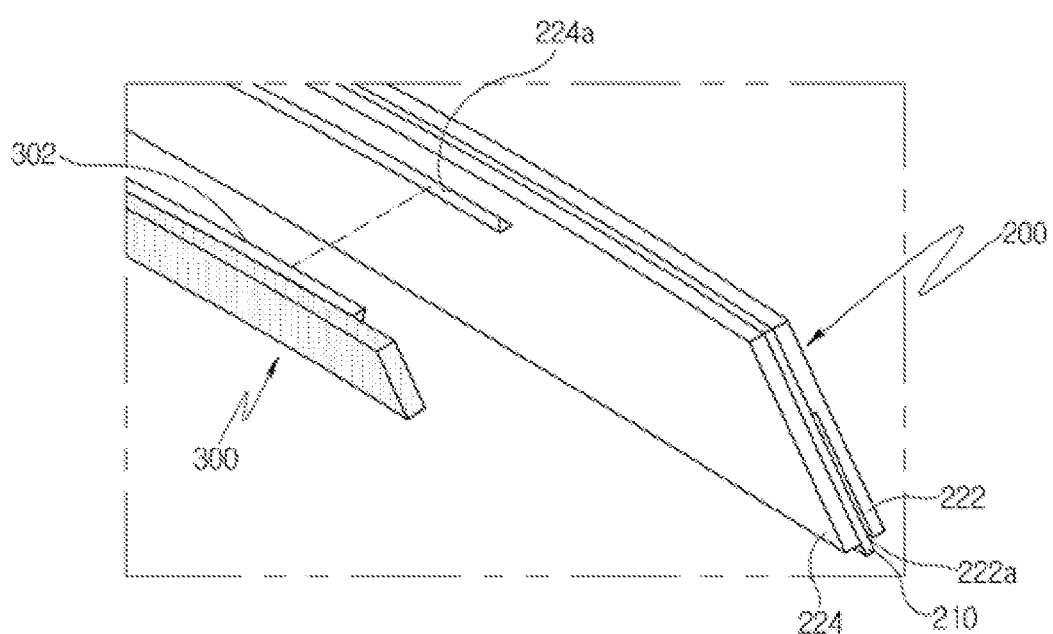
FIG. 18 is a perspective view illustrating a state in which a thermal expansion member according to a fourth exemplary embodiment is coupled with a brush seal part.

Referring to FIG. 12 or 18, the thermal expansion member 300 includes the insertion part 302 which is inserted into the slot groove 224a and the insertion part 302 is formed only in some section of the thermal expansion member 300. The reason why the insertion part 302 is formed only in the some section is to stably perform the thermal expansion in the state in which it adheres to the second support plate 224 when the thermal expansion member 300 is thermally expanded in the length direction.

The thermal expansion member 300 extends along the length direction of the upper surface of a second support plate 224 in the adhering state and receives heat transferred from the high-temperature fluid and thus is thermally expanded in the circumferential direction of the packing body 100.

According to the exemplary embodiment, when the thermal expansion member 300 is thermally expanded in the length direction, the thermal expansion member 300 is pressed toward the lower portion of the packing body 100 by the fixing member 400 to be described below to press the brush seal parts 200 in the radial direction.

That is, the front and rear end portions of the brush seal part 200 are each fixed by the fixing member 400 in the circumferential direction based on the brush seal part 200 and when the brush seal part 200 is thermally expanded in the radial direction, the brush seal part 200 is pressed in the radial direction by the fixing member 400 and thus maintains the stably fixed state both in the circumferential direction and the radial direction of the packing body 100.

In particular, when the heat conduction is made by the high-temperature fluid, the brush seal part 200 maintains in the stably fixed state in the circumferential direction and the radial direction and the predetermined quantity of high-pressure fluid moves through the brush 210, and as a result, the sealing efficiency may be enhanced and efficiency of an object mounted with the brush seal part 200 may be more stably maintained.

For example, when the rotor 5 is installed in the steam turbine, as described above, the high-temperature fluid moves through the brush seal part 200 and thus the brush seal part 200 is stably fixed in the packing body 100, and at the same time the sealing is stably maintained in the circumferential direction and the radial direction, thereby reducing the fluid leaking flow which is unnecessarily leaked.

The thermal expansion member 300 is disposed to face the fixing member 400, and in more detail, the end of the thermal expansion member 300 and the fixing member 400 are maintained to be spaced apart from each other or adhere to each other in consideration of the change in length depending on the expansion of the thermal expansion member 300.

For reference, the spaced length is not particularly limited, but when the thermal expansion member 300 is thermally expanded, the thermal expansion member 300 is preferably positioned at the adjacent position so that the pressing may be stably made in the radial direction by the fixing member 400.

The thermal expansion member 300 may be provided with the inclined surface 310 inclined downward toward the fixing member 400, and the angle and the length of the inclined surface 310 are not particularly limited but the inclined surface 310 may be preferably inclined in the form illustrated in the drawing so that the pressing may be stably made by the front end portion of the fixing member 400.

The inclined surface 310 may be formed in the form in which the front and rear end portions of the thermal expansion member 300 are inclined in the same form, and thus when the thermal expansion member 300 is pressed by the fixing member 400, it may easily move in one direction.

Figure 19:
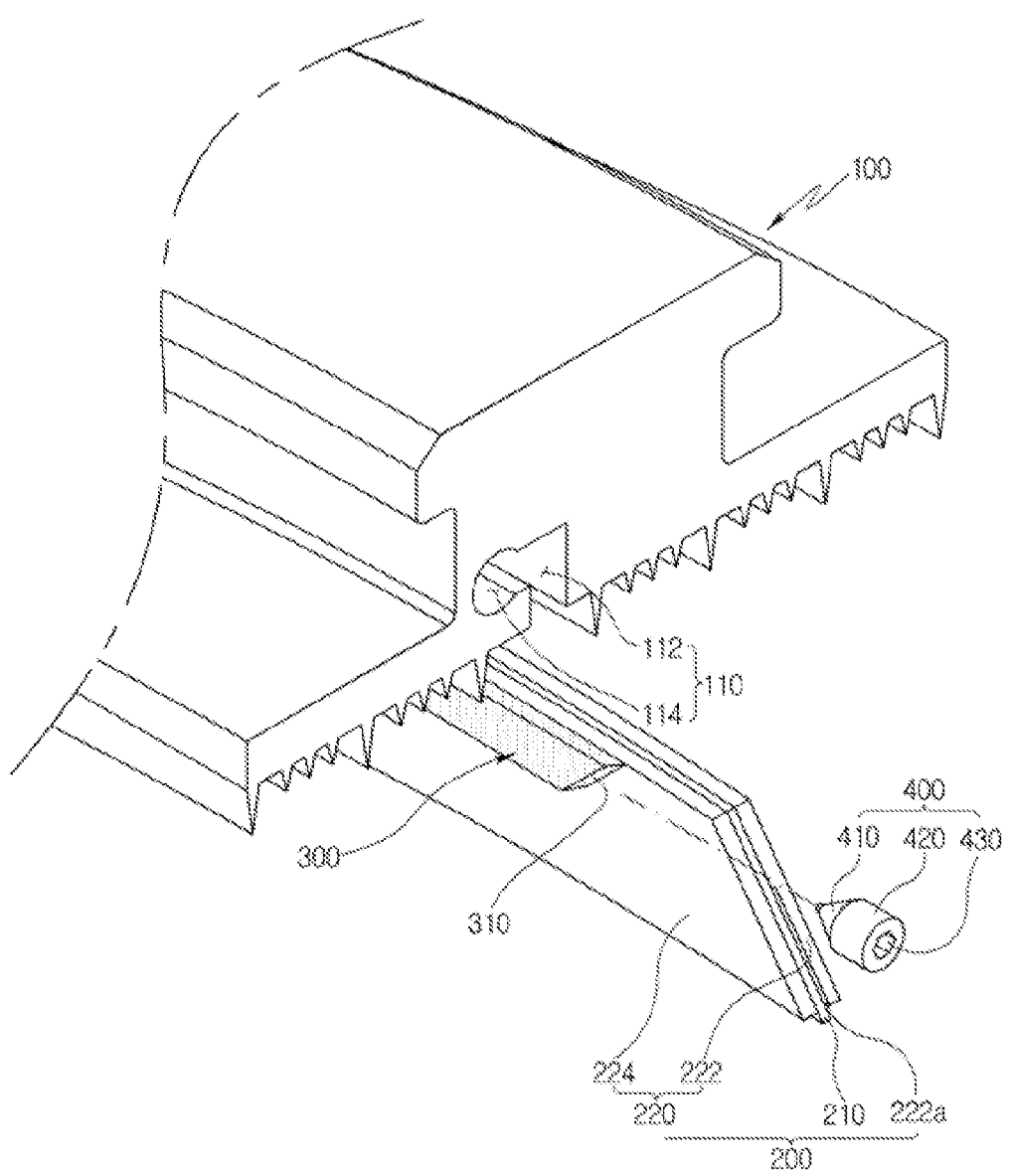
FIG. 19 is an exploded perspective view illustrating another example of the brush seal assembly according to the exemplary embodiment.
Figure 20:
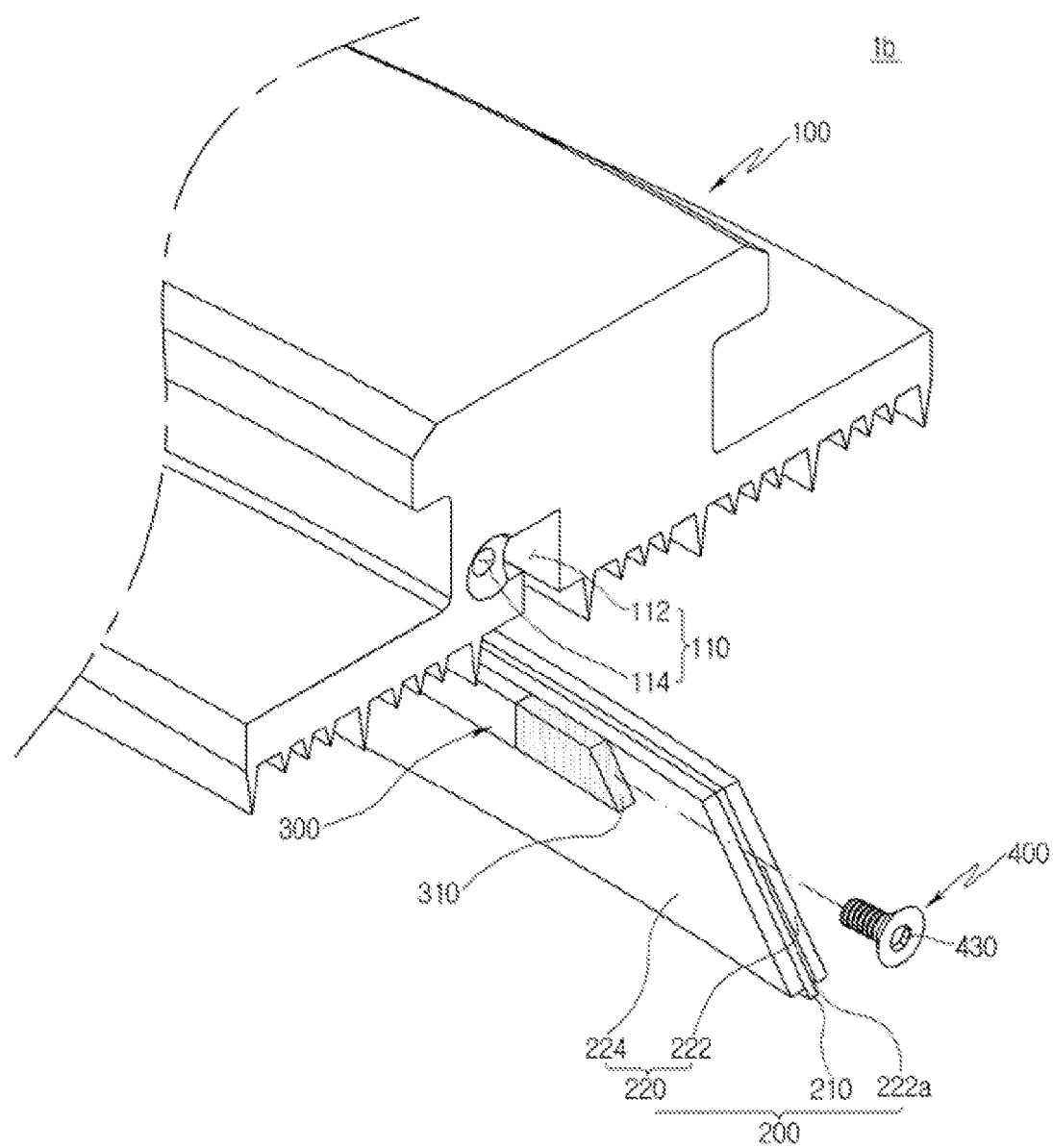
FIG. 20 is an exploded perspective view of a brush seal assembly according to a fifth exemplary embodiment.
Figure 21:
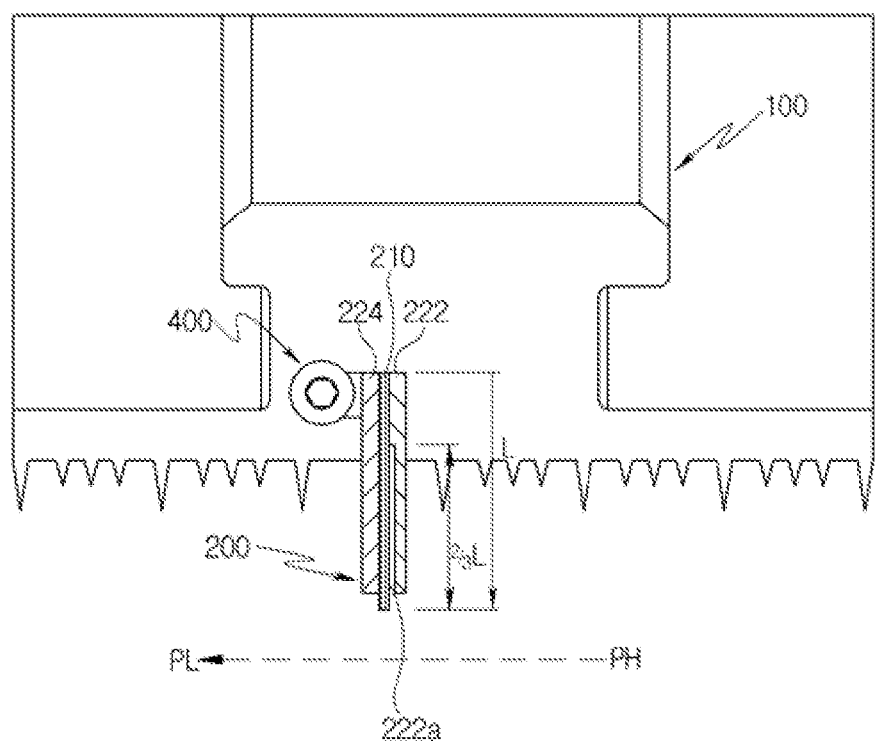
FIG. 21 is a coupled front view of FIG. 20.
Figure 22:
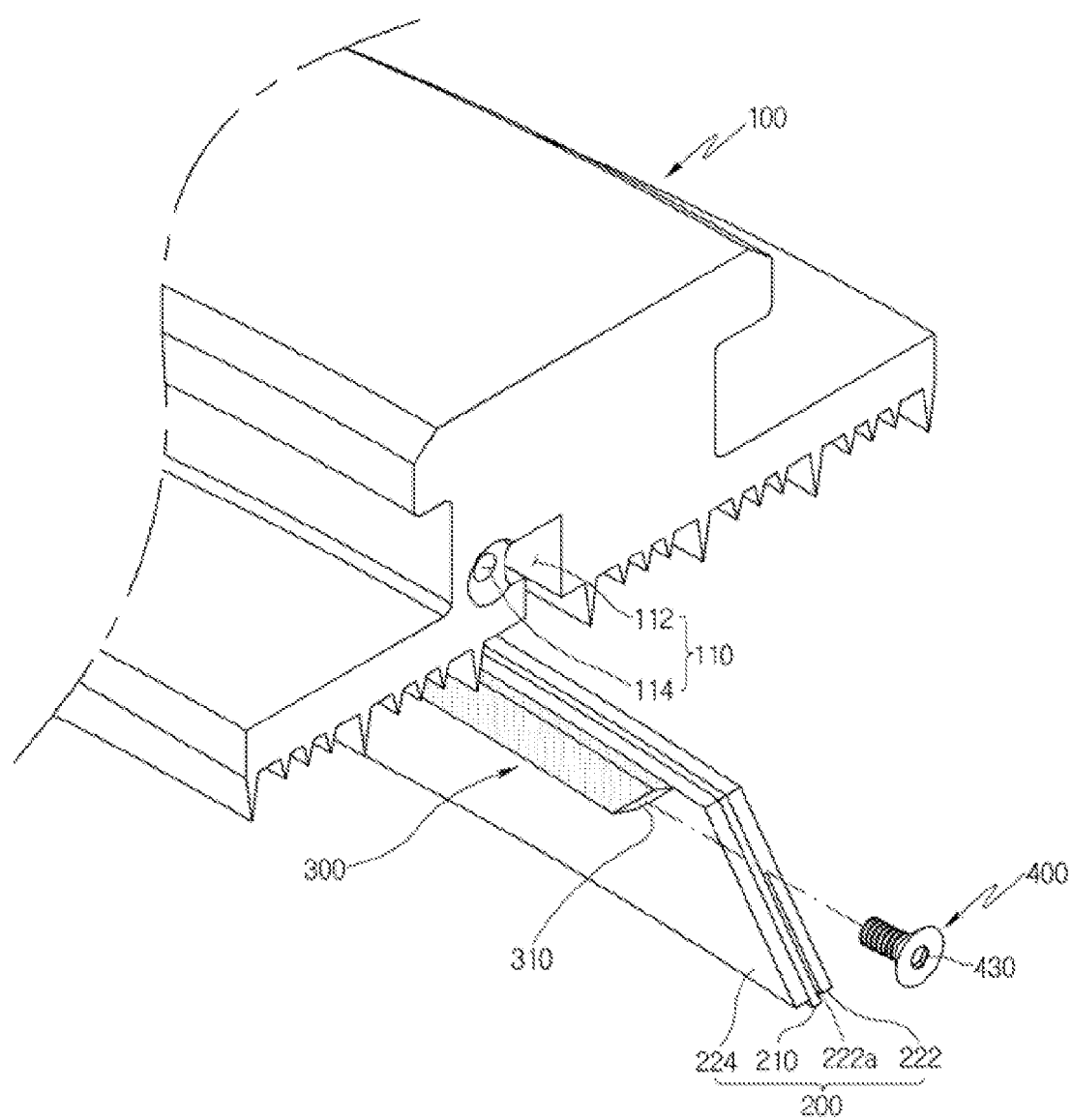
FIG. 22 is an exploded perspective view illustrating a brush seal assembly according to another exemplary embodiment.
Figure 23:
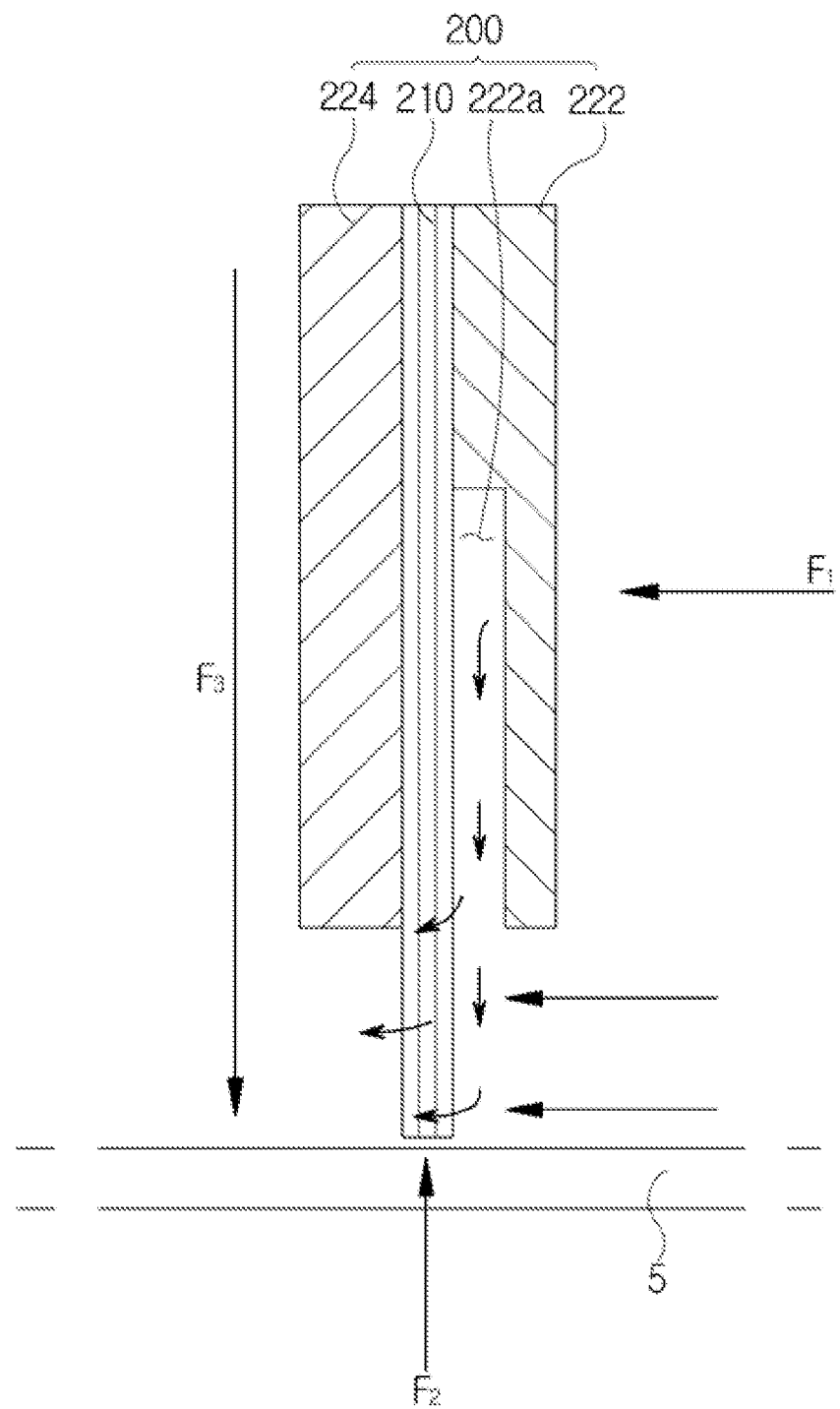
FIG. 23 is a diagram illustrating an example of the fluid moving to the brush seal part according to an exemplary embodiment and the pressure state applied to the brush seal through the rotating body.

Referring to FIG. 19, the thermal expansion member 300 according to another exemplary embodiment may be provided with the inclined surface 310 in a form inclined upward toward the fixing member 400 and when the thermal expansion member 300 is expanded, the brush seal part 200 may move upward in the radial direction by the fixing member 400. Therefore, the brush seal assembly according to the exemplary embodiment may easily move the brush seal parts 200 toward the rotor 5 in the radial direction.

The brush seal assembly according to the exemplary embodiment makes the pressing in the radial direction of the packing body 100 in both directions of the front and rear end portions of the brush seal part 200 but makes the pressing either inward or outward based on the packing body 100.

That is, when the thermal expansion member 300 is thermally expanded, the inclined surface 310 is pressed by the fixing member 400 and the sealing between the rotor 5 and the brush 210 is stably maintained while the pressing is selectively made either inward or outward based on the packing body 100 depending on the inclined direction of the inclined surface 310 to prevent the fluid from being leaked.

As such, the pressing is made inward or outward in the radial direction of the packing body 100 by the fixing member 400 depending on how much the brush seal part 200 is thermally expanded and when the high-pressure fluid moves toward the brush seal part 200, the leaking flow of the fluid may be maintained over a long period of time in the stable state by the brush seal part 200, thereby enhancing the efficiency of the object in which the brush seal assembly is installed.

For example, the control of the gap between the brush seal part 200 and the rotor 5 may maintain the gap relatively more constant than the case in which a lower end of the brush 210 is excessively bent. In this case, the inclined direction for the inclined surface of the thermal expansion member 300 may be set by the previous simulation for the gap between the brush 210 and the rotor 5 and the behavior of the brush 210 to configure the brush seal assembly, thereby stably maintaining the high-pressure fluid leakage by the brush 210.

As the fixing member, any one of a pin or a bolt may be optionally used and both of the pin and the bolt are coupled with the packing body 100, which is then stably fixed by welding. For reference, it is to be noted that other fixing members other than the foregoing pin or bolt may be used to fix the packing body 100.

The used fixing member according to the exemplary embodiment is configured of a head 410 and a body 420, in which the body 420 extends toward the thermal expansion member 300.

Like the thermal expansion member 300, the head 410 is thermally expanded toward the thermal expansion member 300 when it is conducted with the high-temperature heat, thereby pressing the inclined surface 310. A material of the head 410 is not particularly limited and therefore the head 410 may be made of the same as or different from that of the thermal expansion member 300, but when it is conducted the high-temperature heat, any material which may be thermally expanded stably may be used.

The body 420 extends toward a rear of the head 410 and is inserted into the insertion groove 100 in the adhering state, thereby stably supporting the brush seal part 200 in the circumferential direction.

The head 410 and the body 420 may be made of different kinds of materials and the body 420 is not thermally expanded even when it is conducted with the high-temperature heat but only the head 410 may be configured to be thermally expanded forward.

According to the exemplary embodiment, unlike the foregoing description, the fixing member may be made of a steel material and therefore both of the head and the body are not thermally expanded. In this case, the fixing member is not thermally expanded toward the thermal expansion member 300 but fixes the brush seal part 200 in the circumferential direction.

For example, when the bolt is used as the fixing member 400, a thread is formed on an outer circumferential surface thereof along a length direction and a thread corresponding to the thread formed on the fixing member is formed on the packing body 100 and thus a screw connection therebetween is made, thereby maintaining the stably fixed state.

Further, when the fixing member 400 is configured of the bolt, in the case in which the thermal expansion toward the thermal expansion member 300 is not made and the support of the brush seal part 200 in the circumferential direction and the thermal expansion of the thermal expansion member 300 are made, the brush seal parts 200 are pressed inward or outward based on the packing body 100 to constantly maintain the gap between the brush 210 and the rotor 5.

A brush seal assembly according to another exemplary embodiment will be described with reference to the accompanying drawings.

Referring to FIGS. 20 to 23, the brush seal assembly 1b is configured to include the packing body 100, the brush seal part 200, the thermal expansion members 300, and the fixing members 400, in which the brush seal part 200 stably maintains the airtightness between the rotor 5 rotating at a predetermined speed and the fixing body.

For this purpose, The brush seal assembly according to the exemplary embodiment is configured to include the packing body 100 positioned between the rotor 5 and the fixing body and provided with the insertion groove 110 toward the rotor 5, the brush 210 extending to be inclined toward the rotor 5 in the state in which one end of the brush 210 is inserted into the insertion groove 110, a brush seal part 200 including the support member 220 which supports the brush 210, the thermal expansion members 300 adhering to sides of the support member 220 and partially thermally expanded in the length direction in the whole circumferential direction of the packing body 100, and the fixing member 400 inserted into the insertion groove 110 to fix the brush seal part 200.

The thermal expansion member 300 is pressed inward or outward in the length direction or the radial direction of the packing body 100 by the fixing member 400 depending on the heat conduction transferred to the brush seal part 200 through the rotor 5 to maintain the airtightness.

For this purpose, according to the exemplary embodiment, the packing body 100 which is positioned between the rotor 5 and the fixing body and is formed with an insertion groove 110 is positioned to face the rotor 5 and the packing body 100 is formed of the plurality of individual unit bodies and thus is assembled in a ring shape in the outer circumferential direction of the rotor 5. That is, the plurality of packing bodies 100 having the predetermined length are installed outside the rotor 5 in the state in which they are spaced apart from each other at a predetermined interval.

When the brush seal parts 200 are inserted into the insertion grooves 110, the packing body 100 has the ring shape on the whole and the packing body is configured to include the seal insertion groove 112 and the fixing member insertion groove 114 into which the support member 220 is inserted, in which the seal insertion groove 112 and the fixing member insertion groove 114 are formed to communicate with each other.

The insertion groove 110 is not opened only for the insertion of the brush seal part 200, the seal insertion groove 112 for stably supporting the brush seal part 200 depending on a pressure of a high-pressure fluid in the state in which the brush seal part 200 is inserted into the insertion groove 110 is formed of a rectangular cross section form, and the fixing member insertion groove 114 into which the support member 220 is inserted has a circular cross section shape.

The support member 220 includes the first support plate 222 which adheres to one side of the brush 210 and the second support plate 224 which adheres to the other side of the brush 210. The first support plate 222 is provided with the guide groove 222a to guide the flow of fluid from the inner side facing the brush 210 toward the lower portion of the brush 210 so as to induce the flow of the high-pressure fluid to the gap between the rotor 5 and the brush 210, thereby implementing the stable movement. Therefore, when the high-pressure fluid moves to the brush 210 through the first support plate 222, the unnecessary eddy phenomenon may be reduced and the flow of fluid toward the lower end of the brush 210 may be induced.

For reference, the right pressure of the brush 210 is relatively higher than the left pressure of the brush 210, the flow of fluid moves from the right to the left, and the brush 210 prevents a fluid in the high-pressure region from being leaked to the low-pressure region.

In an embodiment, when the whole length of the first support plate 222 is set to be L, the guide groove 222a may be formed in an opened state at a height corresponding to, for example, ⅔ L from a lower portion. In an embodiment, when the height of the guide groove 222a is formed at a length which is less than half of L, it may be difficult to stably guide the high-pressure fluid and when the height of the guide groove 222a extends to a length of ⅔ L, stiffness of the first support plate 220 may be weakened. In such an embodiment, the guide groove 222a may be formed at the foregoing height.

In addition to the illustrated shape, the shape of the guide groove 222a may be changed to the rounded shape and may be optimally set through the simulation depending on the movement of the high-pressure fluid.

The second support plate 224 adheres to an opposite side of the brush 210 in the state in which it faces the first support plate 222 and has a slot groove 224a provided one side thereof facing the thermal expansion member 300 to be described below. When the high-pressure fluid moves through the first support plate 222 and the brush 210, the first support plate 222 prevents the brush 210 from being deformed due to the pressure difference between the left and the right and maintains the brush 210 in the stable support state.

The thickness of the second support plate 224 is formed to correspond to that of the first support plate 220 but is not necessarily limited thereto and therefore it is to be noted that the thickness of the second support plate 224 may be changed. The second support plate 224 is positioned in the state in which it adheres to one surface of the brush 210 to stably maintain the pressure of the high-pressure fluid applied to the brush 210. Further, the slot groove 224a may be formed at a position facing the thermal expansion member 300 to stably install and expand the thermal expansion member 300.

The thermal expansion member 300 extends along the length direction of the upper surface of a second support plate 224 in the adhering state and receives heat transferred from the high-temperature fluid and thus is partially thermally expanded in the circumferential direction of the packing body 100.

In particular, according to the exemplary embodiment, when the thermal expansion member 300 is thermally expanded, the thermal expansion member 300 is thermally expanded in a longitudinal length and is pressed toward a lower portion of the packing body 100 by the fixing member 400 to be described below to press the brush seal parts 200 in the radial direction.

That is, front and rear end portions of the brush seal part 200 are each fixed by the fixing member 400 in the circumferential direction based on the brush seal part 200 and when the brush seal part 200 is thermally expanded in the radial direction, the brush seal part 200 is pressed in the radial direction by the fixing member 400 and thus maintains the stably fixed state both in the circumferential direction and the radial direction of the packing body 100.

Further, the thermal expansion member 300 according to the exemplary embodiment is not thermally expanded in the whole length direction but thermally expanded in the length direction only in the front and rear end portions. As such, the case in which the thermal expansion is made only in the specific section may have improved responsiveness than the case in which the thermal expansion is made in the whole length, and thus the operation may be performed more quickly.

In more detail, the intermediate section in the length direction of the thermal expansion member 300 is made of a general material and thus may not be thermally expanded and only the front and rear end portions of the thermal expansion member 300 is made of a material which is thermally expanded and thus may be thermally expanded, in which the thermal expansion member is disposed to face the fixing member 400.

In particular, the brush seal assembly 1b is pressed in the radial direction in both directions of the front and rear end portions of the brush seal part 200 by the fixing member 400 and is pressed either inward or outward based on the packing body 100 and therefore may be selectively installed so as to meet a condition that the internal expansion or the external expansion of the packing body 100 is made depending on the operation state of the object in which the brush seal assembly 1b is installed.

An operation state of the brush seal assembly according to the exemplary embodiment configured as described above will be described with reference to the accompanying drawings.

Figure 24A:
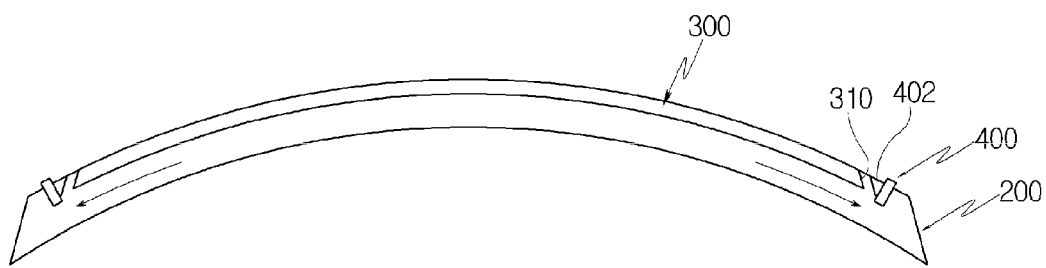
FIGS. 24A and 24B and 25A and 25B are operational state diagrams of the brush seal assembly according to the exemplary embodiment.
Figure 24B:
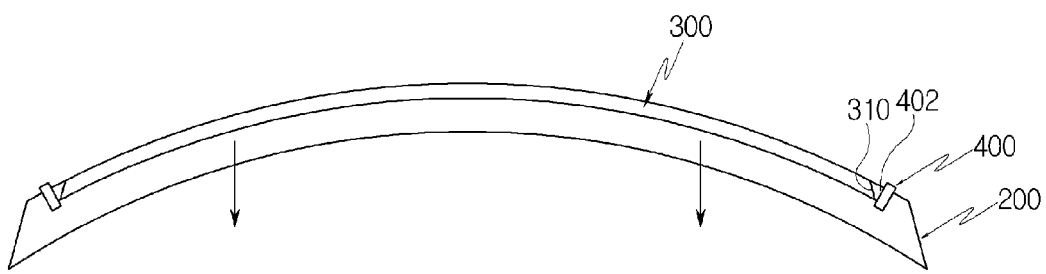

Referring to FIG. 2 or FIGS. 24A and 24B, a worker inserts the brush seal part 200 into the packing body 100 and then fixes the previously inserted brush seal part 200 in the circumferential direction by the fixing member 400. If it is determined that the brush seal part 200 is mounted into the fixing member insertion groove 114 in an instable state, when the brush seal part 200 is pulled outward in the state in which the tool is inserted into the tool insertion groove 400c, the previously inserted fixing member 400 is easily drawn to the outside of the fixing member insertion groove 114.

Further, the worker correctly maintains the mounting state of the brush seal part 200 and then again inserts the separated fixing member 400 into the fixing member insertion groove 114.

The fixing member 400 has a polygonal block shape and therefore is stably inserted in the X-axis and Y-axis direction based on the brush seal part 200.

To prepare the case in which the fixing member 400 is inserted into the insertion groove 110 and then the high-temperature heat is conducted to the brush seal part 200, the outside of the fixing member 400 is fixed by the welding to prevent the fixing member 400 from being separated to the outside, the front and rear end portions of the brush seal part 200 are stably fixed in the circumferential direction by the fixing member 400.

The high-pressure fluid is guided to the lower portion of the brush 210 through the guide groove 222a of the first support plate 222 and then moves in an arrow direction through the brush 210 and the pressure applied to the brush seal part 200 by the high-pressure fluid is stably maintained by the second support plate 224 and the fixing member 400.

In particular, the brush seal part 200 inserted into the insertion groove 100 is maintained in the adhering state to the seal insertion groove 110 and therefore the high-pressure fluid moves in an arrow direction only through the brush 210.

If it is determined that the high-temperature heat is conducted to the brush seal part 200 through the rotor 5, the thermal expansion member 300 is thermally expanded along the circumferential direction of the packing body 100 and thus a guide protrusion 404 contacts the inclined surface 310 of the fixing member 400, such that the thermal expansion member 300 is pressed downward.

The guide part 402 is thermally expanded along with the thermal expansion member 300 and therefore when the high-temperature heat is conducted, the fixing member 400 may move the brush seal parts 200 in the radial direction of the packing body, and the fixing member 400 stably supports the whole brush seal part 200 in the circumferential direction and thus stably maintains the whole seal part 200 even when the vibration due to the heat conduction and the sudden change in pressure through the rotor 5 is continuously applied to the brush seal part 200.

When being operated as described above, the thermal expansion member 300 is fixed to the second support plate 224 and therefore the brush seal parts 200 move inward in the radial direction of the packing body 100 to maintain the constant gap between the lower end of the brush 210 and the outer circumferential surface of the rotor 5.

In particular, the brush seal parts 200 may be maintained to maintain the constant gap toward the rotor 5 under the condition that the lower end of the brush 210 contacts the outer circumferential surface of the rotor 5 and therefore the high-pressure fluid is constantly maintained as much as a first design value, thereby preventing the unnecessary fluid from being leaked.

An operation state of a brush seal assembly according to another exemplary embodiment will be described with reference to the accompanying drawings.

Figure 25A:
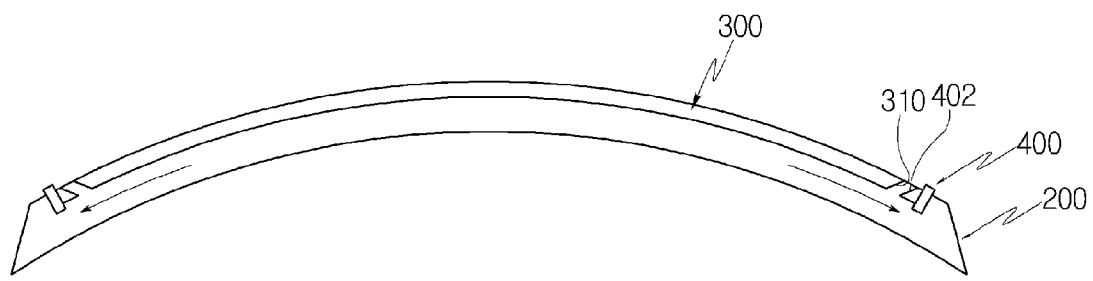
Figure 25B:
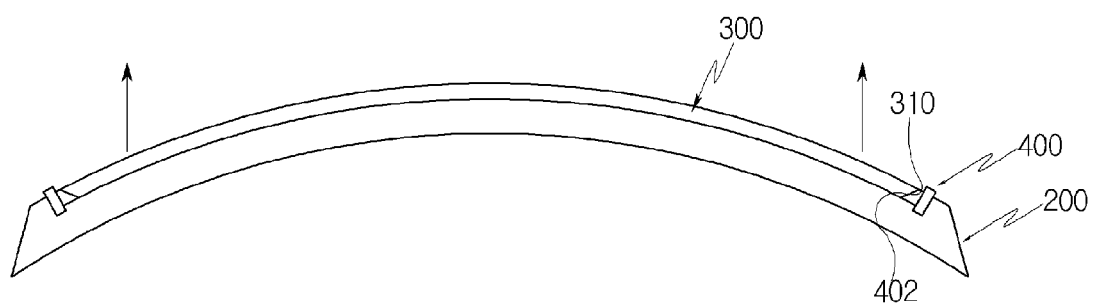

Referring to FIGS. 25A and 25B, a worker inserts the brush seal part 200 into the packing body 100 and then fixes the previously inserted brush seal part 200 in the circumferential direction by the fixing member 400. If it is determined that the brush seal part 200 is mounted into the insertion groove 110 in an instable state, when the brush seal part 200 is pulled outward in the state in which the tool is inserted into the tool insertion groove 400c, the previously inserted fixing member 400 is easily drawn to the outside of the insertion groove 110.

Further, the worker correctly maintains the mounting state of the brush seal part 200 and then again inserts the separated fixing member 400 into the fixing member insertion groove 114.

The fixing member 400 has a polygonal block shape and therefore is stably inserted in the X-axis and Y-axis direction based on the brush seal part 200.

As such, after the fixing member 400 is inserted into the insertion groove 114, if the outside of the fixing member 400 is fixed by the welding to prevent the fixing member 400 from being separated to the outside even when the vibration or the high-temperature heat is conducted, the front and rear end portions of the brush seal part 200 are stably fixed in the circumferential direction by the fixing member 400.

The high-pressure fluid is guided to the lower portion of the brush 210 through the guide groove 222a of the first support plate 222 and then moves through the brush 210 and the pressure applied to the brush seal part 200 by the high-pressure fluid is stably maintained by the second support plate 224 and the fixing member 400.

When the high-temperature heat is conducted to the brush seal part 200 through the rotor 5, the thermal expansion member 300 is thermally expanded in the circumferential direction only in the front and rear end portions of the packing body and thus contacts the inclined surface 310 of the fixing member 400.

The inclined surface 310 is inclined at a predetermined angle and therefore the brush seal parts 200 adhering to the thermal expansion members 300 move from the inside of the packing body outward in the radial direction thereof, thereby stably maintaining the sealing of the brush 210.

The operation state of the brush seal assembly according to the exemplary embodiment configured as described above will be described with reference to the accompanying drawings.

Figure 26A:
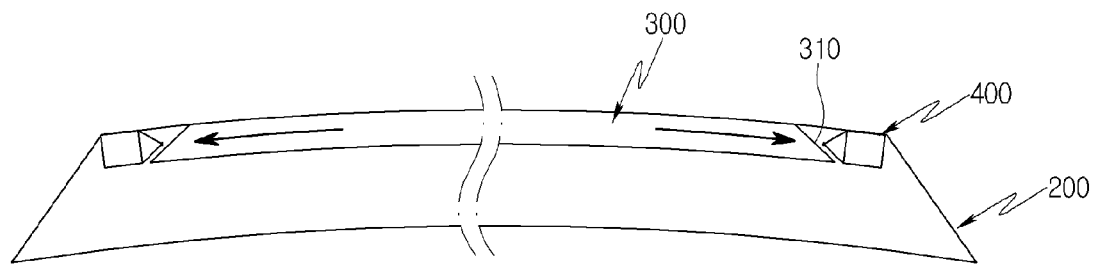
FIGS. 26A and 26B and 27A and 27B are the operational state diagrams of the brush seal assembly according to the fourth and fifth exemplary embodiments.
Figure 26B:
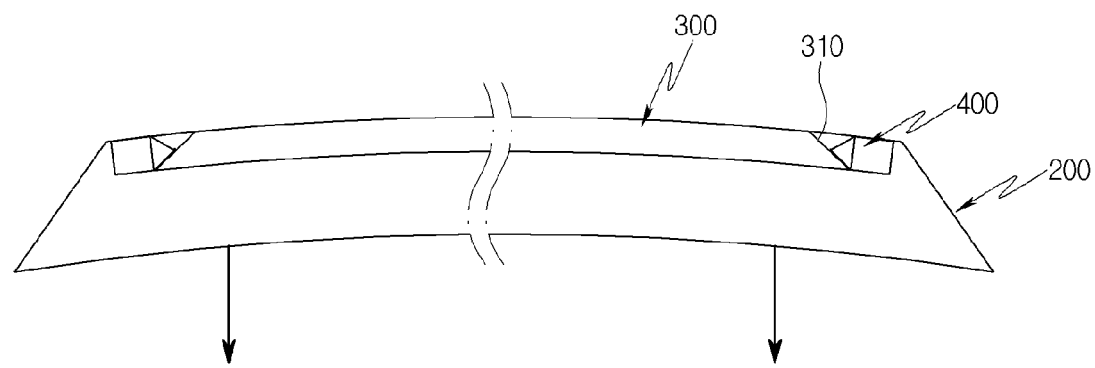
Figure 27A:
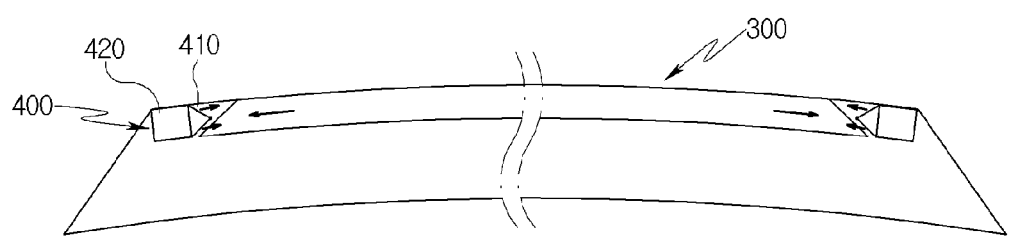
Figure 27B:
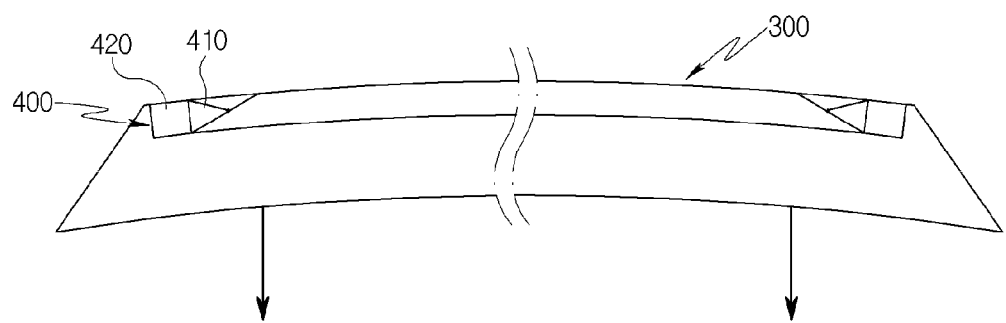

Referring to FIG. 12 or FIGS. 26A and 26B, a worker inserts the brush seal part 200 into the packing body 100 and then fixes the previously inserted brush seal part 200 in the circumferential direction by the fixing member 400. If it is determined that the brush seal part 200 is mounted into the insertion groove 110 in an instable state, when the brush seal part 200 rotates in one direction in the state in which the tool is inserted into the tool insertion groove 430, the previously inserted fixing member 400 is easily drawn to the outside of the insertion groove 110.

Further, the worker correctly maintains the mounting state of the brush seal part 200 and then again inserts the separated fixing member 400 into the insertion groove 110.

As such, after the fixing member 400 is inserted into the insertion groove 110, if the outside of the fixing member 400 is fixed by the welding to prevent the fixing member 400 from being separated to the outside even when the vibration or the high-temperature heat is conducted, the front and rear end portions of the brush seal part 200 are stably fixed in the circumferential direction by the fixing member 400.

The high-pressure fluid is guided to the lower portion of the brush 210 through the guide groove 222a of the first support plate 222 by a pressure of F1 and then moves in an arrow direction through the brush 210 and F3 which is a pressing force applied toward the rotor 5 by the brush seal part 200 and F2 which is a pressing force from the rotor 5 toward the brush seal part 200 are simultaneously applied.

In particular, the brush seal part 200 inserted into the insertion groove 100 is maintained in the adhering state to the seal insertion groove 110 and therefore the high-pressure fluid moves in an arrow direction only through the brush 210.

If it is determined that the high-temperature heat is conducted to the brush seal part 200 through the rotor 5, the thermal expansion member 300 is thermally expanded along the circumferential direction of the packing body 100 and thus the head 410 directly contacts the inclined surface 310 of the fixing member 410 and all the thermal expansion members 300 are pressed in the radial direction of the packing body 100.

Only the head 410 part of the fixing member 400 is thermally expanded and thus contacts the inclined surface 310 and presses the brush seal parts 200 together with the thermal expansion members 300 in the radial direction.

The thermal expansion member 300 is fixed to the second support plate 224 and therefore the brush seal parts 200 move inward in the radial direction of the packing body 100 to maintain the constant gap between the lower end of the brush 210 and the outer circumferential surface of the rotor 5.

In particular, the brush seal parts 200 may be maintained to maintain the constant gap toward the rotor 5 under the condition that the lower end of the brush 210 contacts the outer circumferential surface of the rotor 5 and therefore the high-pressure fluid is constantly maintained as much as a first design value, thereby preventing the fluid from being unnecessarily leaked.

An operation state of a brush seal assembly according to another exemplary embodiment will be described with reference to the accompanying drawings.

Referring to FIG. 19, FIG. 23, or FIGS. 27A and 27B, a worker inserts the brush seal part 200 into the packing body 100 and then fixes the previously inserted brush seal part 200 in the circumferential direction by the fixing member 400. If it is determined that the brush seal part 200 is mounted into the insertion groove 110 in an instable state, when the brush seal part 200 rotates in one direction in the state in which the tool is inserted into the tool insertion groove 430, the previously inserted fixing member 400 is easily drawn to the outside of the insertion groove 110.

Further, the worker correctly maintains the mounting state of the brush seal part 200 and then again inserts the separated fixing member 400 into the insertion groove 110.

As such, after the fixing member 400 is inserted into the insertion groove 110, if the outside of the fixing member 400 is fixed by the welding to prevent the fixing member 400 from being separated to the outside even when the vibration or the high-temperature heat is conducted, the front and rear end portions of the brush seal part 200 are stably fixed in the circumferential direction by the fixing member 400.

The high-pressure fluid is guided to the lower portion of the brush 210 through the guide groove 222a of the first support plate 222 by a pressure of F1 and then moves in an arrow direction through the brush 210 and F3 which is a pressing force applied toward the rotor 5 by the brush seal part 200 and F2 which is a pressing force from the rotor 5 toward the brush seal part 200 are simultaneously applied.

If it is determined that the high-temperature heat is conducted to the brush seal part 200 through the rotor 5, the thermal expansion member 300 is thermally expanded along the circumferential direction of the front and rear end portions of the packing body 100 and thus the head 410 directly contacts the inclined surface 310 of the fixing member 410 and the thermal expansion members 300 may be more quickly pressed in the radial direction of the packing body 100, thereby performing the sealing.

According to the exemplary embodiments, it is possible to reduce the occurrence of heat and abrasion from the brush by increasing the contact area between the fixing member and the packing body which adhere to each other in the face-to-face when the fixing member is fitted in the packing body to enhance the fixing force in the circumferential direction or the circumferential direction and the radial direction of the packing boy, thereby maintaining the silent operation.

Further, according to the exemplary embodiments, since the predetermined quantity of fluid may pass through the gap between the rotating body and the brush seal, it is possible to enhance the efficiency of the turbine so as to increase the power output, enhance the durability of the brush assembly, prevent the operation stop of the turbine due to the failure, and save costs due to the replacement and repair.

According to the exemplary embodiments, it is possible to support and fix the brush seal assembly in both directions including the radial direction and the circumferential direction, thereby maintaining the silent operation.

Further, according to the exemplary embodiments, since the predetermined quantity of fluid may pass through the gap between the rotating body and the brush seal, it is possible to enhance the efficiency of the turbine so as to increase the power output, enhance the durability of the brush assembly, prevent the operation stop of the turbine due to the failure, and save costs due to the replacement and repair.

It should be understood that the above described embodiments may be changed and modified in various ways by those skilled in the art, without departing from the spirit and scope described in claims.

What is claimed is:

1. A brush seal assembly, comprising:
    a packing body configured to be positioned between a rotating body and a fixing body and to include an insertion groove;
    a brush seal part including a brush configured to extend toward the rotating body and inserted at one end into the insertion groove and into a support member supporting the brush, the support member having a first support plate and a second support plate, the first support plate being configured to adhere to a first side of the brush, and the second support plate including a first side configured to adhere to a second side of the brush;
    a thermal expansion member configured to adhere to a second side of the second support plate and to be thermally expanded in a circumferential direction of the packing body; and
    a fixing member configured to be fitted in the insertion groove to face the thermal expansion member to fix the brush seal part in the circumferential direction and a radial direction of the packing body.

2. The brush seal assembly of claim 1, wherein the fixing member has a polygonal shape to maintain a state in which an inner circumferential surface of the insertion groove and an outer circumferential surface of the fixing member adhere to each other.

3. The brush seal assembly of claim 1, wherein the fixing member includes:
    a first fixing body configured to extend in a length direction; and
    a second fixing body configured to be integrally formed with the first fixing body and to extend orthogonally from the first fixing body.

4. The brush seal assembly of claim 1, wherein the thermal expansion member has an end portion that includes an inclined surface inclined downward toward the fixing member.

5. The brush seal assembly of claim 1, wherein the thermal expansion member has an end portion that includes an inclined surface inclined upward toward the fixing member.

6. The brush seal assembly of claim 4, wherein the fixing member includes:
a guide part disposed to face the thermal expansion member and inclined toward the thermal expansion member.

7. The brush seal assembly of claim 6, wherein the guide part is thermally expanded toward the inclined surface.

8. The brush seal assembly of claim 6, wherein the guide part includes a guide protrusion protruding toward an outer side of a front surface and contacting the inclined surface.

9. The brush seal assembly of claim 1, wherein the insertion groove includes:
a seal insertion groove formed in a circumferential direction inside the packing body and configured to have the brush seal part inserted thereinto;
a stepped part stepped in a side direction of the seal insertion groove; and
a fixing member insertion groove formed to insert the fixing member into an inner side of the stepped part.

10. The brush seal assembly of claim 1, wherein the insertion groove includes:
a seal insertion groove formed in a circumferential direction inside the packing body and configured to have the brush seal part inserted thereinto; and
a fixing member insertion groove formed to be symmetrical with the seal insertion groove and to have the fixing member inserted thereinto.

11. The brush seal assembly of claim 1, wherein
the first side of the first support plate includes a guide groove to guide a flow of fluid from an inner side facing the brush toward a lower portion of the brush, and
the second side of the second support plate includes a slot groove.

12. The brush seal assembly of claim 1, wherein the brush seal part is pressed in the radial direction by the fixing member and is pressed either inward or outward based on the packing body.

13. A brush seal assembly, comprising:
a packing body configured to be positioned between a rotating body and a fixing body and including an insertion groove toward the rotating body;
a brush seal part including a brush configured to extend and inclined toward the rotating body, and to be inserted at one end into the insertion groove and into a support member supporting the brush; the support member having a first support plate and a second support plate the first support plate being configured to adhere to a first side of the brush and the second plate including a first side configured to adhere to a second side of the brush;
thermal expansion members configured to adhere to a second side of the first support plate and a second side of the second support plate and be thermally expanded in a circumferential direction of the packing body; and
fixing members configured to be fitted in insertion grooves to fix brush seal parts and to include a guide part to fix the brush seal parts,
wherein the brush seal parts are thermally expanded toward each thermal expansion member to adhere to the thermal expansion members, in a circumferential direction of the packing body.

14. The brush seal assembly of claim 13, wherein the fixing member has a polygonal shape to maintain a state in which an outer circumferential surface of the fixing member and an inner circumferential surface of the insertion groove adhere to each other and a rear surface of the fixing member is provided with a tool insertion groove configured to receive a tool.

15. The brush seal assembly of claim 13, wherein the fixing member includes:
a front portion of the guide part that is inclined toward the thermal expansion member.

16. The brush seal assembly of claim 13, wherein the thermal expansion member includes an inclined surface inclined downward or upward toward the fixing member.

17. The brush seal assembly of claim 13, wherein the fixing member is further configured to include a head extending toward the thermal expansion member and to be thermally expanded toward the thermal expansion member so as to fix the brush seal part and a body extending to a rear of the head.

18. The brush seal assembly of claim 17, wherein the insertion groove includes:
a seal insertion groove formed in a circumferential direction inside the packing body and having the brush seal part inserted thereinto; and
a fixing member insertion groove configured to have the fixing member inserted thereinto, wherein the seal insertion groove and the fixing member insertion groove are connected to each other.

19. The brush seal assembly of claim 17, wherein the head and the body are made of different kinds of materials.

20. The brush seal assembly of claim 13, wherein the thermal expansion member to be thermally expanded only at a front end portion and rear end portion based on a length in the circumferential direction.

* * * * *